United States Patent
Luo

(10) Patent No.: US 11,267,464 B2
(45) Date of Patent: Mar. 8, 2022

(54) SYSTEM AND METHOD TO DISTINGUISH BETWEEN MOVING AND STATIC OBJECTS

(71) Applicant: Pony AI Inc., Governors Square (KY)

(72) Inventor: George Chu Luo, Fremont, CA (US)

(73) Assignee: Pony AI Inc., Grand Cayman (KY)

( * ) Notice: Subject to any disclaimer, the term of this patent is extended or adjusted under 35 U.S.C. 154(b) by 288 days.

(21) Appl. No.: 16/521,456

(22) Filed: Jul. 24, 2019

(65) Prior Publication Data

US 2021/0024063 A1    Jan. 28, 2021

(51) Int. Cl.
| | | |
|---|---|---|
| *B60W 30/09* | (2012.01) | |
| *B60W 30/095* | (2012.01) | |
| *G06K 9/00* | (2022.01) | |
| *G08G 1/16* | (2006.01) | |
| *G05D 1/00* | (2006.01) | |

(52) U.S. Cl.
CPC ........ *B60W 30/0956* (2013.01); *B60W 30/09* (2013.01); *G05D 1/0088* (2013.01); *G06K 9/00805* (2013.01); *G08G 1/165* (2013.01); *G08G 1/166* (2013.01); *B60W 2554/00* (2020.02); *G05D 2201/0213* (2013.01)

(58) Field of Classification Search
CPC ............. B60W 30/09; B60W 30/0956; B60W 2554/00; B60W 30/095; G05D 1/0088; G05D 2201/0213; G06K 9/00805; G08G 1/165; G08G 1/166
See application file for complete search history.

(56) References Cited

U.S. PATENT DOCUMENTS

| | | | |
|---|---|---|---|
| 5,471,241 A | 11/1995 | Faibish et al. | |
| 5,809,161 A | 9/1998 | Auty et al. | |
| 7,085,401 B2 | 8/2006 | Averbuch et al. | |
| 11,025,865 B1* | 6/2021 | Medasani | H04N 7/181 |
| 2011/0187863 A1 | 8/2011 | Glander et al. | |
| 2020/0184233 A1* | 6/2020 | Berberian | G06K 9/00798 |
| 2020/0342620 A1* | 10/2020 | Zagajac | G08G 1/163 |

* cited by examiner

*Primary Examiner* — Michael V Kerrigan
(74) *Attorney, Agent, or Firm* — Sheppard Mullin Richter & Hampton LLP

(57) ABSTRACT

An environmental safety system may comprise a plurality of first sensors each located at a predetermined physical location and with a predetermined orientation. The system may receive first sensor data captured at a plurality of time points and by the plurality of first sensors. The system may also determine values of one or more parameters of an object within a threshold distance of the physical location at a last time point of the plurality of time points using the first sensor data. The values of the one or more parameters of the object may comprise a stationary status of the object at the last time point. The values of the one or more parameters of the object may be transmitted to a vehicle approaching the physical location. The vehicle may receive second sensor data captured by a plurality of second sensors in the vehicle. An optimized navigation of the vehicle approaching the physical location may be determined based on stationary status of the object at the last time point and the second sensor data. A driving action may be provided to the vehicle based on the optimized navigation of the vehicle. The driving action may be characterize one or more maneuvers to be performed by the vehicle to execute the optimized navigation nearby the physical location.

16 Claims, 12 Drawing Sheets

SYSTEM AND METHOD TO DISTINGUISH BETWEEN MOVING AND STATIC OBJECTS

TECHNICAL FIELD

The present disclosure relates generally to autonomous vehicle navigation using sensors in the vehicle as well as those outside (e.g., at traffic intersections, in windy parks). More specifically, the present disclosure relates to sensing systems and methods for distinguishing between static and moving objects to improve vehicle navigation.

BACKGROUND

Under conventional sensing systems and methods, an autonomous vehicle may use sensor data collected from its sensors in the vehicle to identify objects in its surroundings and determine its navigation based on the sensor data generated based on the vehicle sensors. Such determination of autonomous vehicle navigation may be limited by the sensing capabilities of the vehicle sensors. Sensor data from the vehicle sensors may not provide comprehensive information regarding objects in the environment of the vehicle. For example, the vehicle sensor may not have the capability to detect stationary status of certain objects in the area of traffic intersection. For example, a vehicle approaching a traffic intersection may include a camera but the camera may not be able to detect every perspective of the object within the field of view of the camera on the vehicle. For example, the additional historical time data of an intersection will allow a more comprehensive distinction between objects static to the intersection, and moving objects in the intersection. These shortfalls are addressed by the present disclosure, which provides the vehicle with greater capability to detect static objects, particularly nearby traffic intersections, and allows the vehicle to efficiently execute an optimized driving action.

SUMMARY

Described herein are systems and methods for detecting static objects by sensor fusion from an environmental safety system and an autonomous vehicle sensor data processing system. Various embodiments of the present disclosure provide an environmental safety system. The environmental safety system may comprise a plurality of first sensors. The plurality of first sensors may be located at a predetermined physical location and with a predetermined orientation. The environmental safety system may comprise a memory storing executable instructions. The environmental safety system may comprise one or more processors in communication with the plurality of first sensors and the memory. The one or more processors may be programmed by the executable instructions to perform receiving first sensor data captured at a plurality of time points and by the plurality of first sensors. The one or more processors may be programmed to determine values of one or more parameters of an object within a first threshold distance of the physical location at a last time point of the plurality of time points using the first sensor data. The values of the one or more parameters of the object may comprise a stationary status of the object at the last time point. The one or more processors may be programmed to transmit the values of the one or more parameters of the object to a vehicle approaching the physical location. The vehicle may further comprise an autonomous vehicle sensor data processing system. The autonomous vehicle sensor data processing system may be configured to perform receiving second sensor data captured by a plurality of second sensors mounted on the vehicle. The autonomous vehicle sensor data processing system may be configured to perform determining a driving action of the vehicle using the stationary status of the object at the last time point and the second sensor data.

In some embodiments, the driving action of the vehicle may be determined by the values of the one or more parameters of the object. In some embodiments, determining the values of the one or more parameters of the object may comprise determining the values of the one or more parameters of the object at a first time point and the last time point of the plurality of time points. The values of at least one of the one or more parameters of the object at the first time point and the last time point may be within a stationary status threshold. In some embodiments, determining the values of the one or more parameters of the object may comprise determining the values of at least one of one or more parameters of the object at the first time point and the last time point of the plurality of the time points. The values of at least one of the one or more parameters of the object at the first time point and the last time point may be below a stationary status threshold.

In some embodiments, determining the values of the one or more parameters of the object may comprise determining the values of the one or more parameters of the object at the last time point using the first sensor data captured at the plurality of time points. In some embodiments, determining the values of the one or more parameters of the object may comprise determining an average value of the values of at least one of the one or more parameters of the object at each of the plurality of time points except the last time point. The average value and the value of the at least one of the one or more parameters of the object at the last time point may be within a stationary status threshold. In some embodiments, determining the values of the one or more parameters of the object may comprise determining an average value of the values of the at least one of the one or more parameters at each of the plurality of time points. The average value may be below a stationary status threshold.

In some embodiments, the environmental safety system may further comprise receiving subsequent first sensor data captured at a subsequent time point. The environmental safety system may comprise determining the values of the one or more parameters of the object at the subsequent time point using the first sensor data. The values of the one or more parameters of the object may not comprise the stationary status of the object at the last time point. The environmental system may comprise transmitting the values of the one or more parameters of the object at the subsequent time point to the vehicle.

In some embodiments, the environmental safety system may comprise receiving subsequent first sensor data captured at a subsequent time point. The environmental safety system may comprise determining the values of the one or more parameters of the object at the subsequent time point using the first sensor data. The values of the one or more parameters of the object may comprise the stationary status of the object at the last time point. The environmental safety system may comprise transmitting the values of the one or more parameters of the object at the subsequent time point to the vehicle In some embodiments, the vehicle is an autonomous vehicle or a semi-autonomous vehicle. In some embodiments, the object is a second vehicle, a pedestrian a statute, a building, or an obstacle within the first threshold distance of the physical location.

In some embodiments, the object is not within the line of sight of a sensor of the plurality of second sensor mounted on the vehicle. In some embodiments, the second sensor data may comprise no sensor data related to the object. In some embodiments, a first sensor of the plurality of first sensors and a second sensor of the second plurality of sensors have different fields of view.

In some embodiments, the plurality of first sensors may comprise sensors of different types, wherein the plurality of first sensors comprises a Light Detection and Ranging (Lidar), a Radio Detection and Ranging (Radar), an imaging device, an ultrasonic sensor. In some embodiments, the plurality of second sensors comprises a Lidar, a Radar, an imaging device, an ultrasonic sensor, a vehicle telemetry sensor, an IMU, and a global positioning system (GPS) sensor.

In some embodiments, the one or more parameters of the object may comprise an identity of the object, a size of the object, a position of the object, a path of the object, and/or a speed of the object.

In some embodiments, the values of the one or more parameters of the object may comprise the position of the object with respect to the physical location, with respect to an absolute reference frame, or with respect to the vehicle.

In some embodiments, the driving action determined may be different from a driving action of the vehicle determined using the second sensor data, not the values of the one or more parameters of the object determined. In some embodiments, determining the driving action may require fewer computational operations than determining a driving action of the vehicle using the second sensor data, not the values of the one or more parameters of the object determined. In some embodiments, the processor may be capable of performing more computational operations within a period of time than the autonomous vehicle sensor data processing system.

Various embodiments of the present disclosure provide a method for road safety under control of a processor. The method may receiving first sensor data captured at a plurality of time points and by a plurality of first sensors. Each of the plurality of first sensors may be located at a predetermined physical location and with a predetermined orientation. The method may comprise determining values of one or more parameters of an object within a first threshold distance of the physical location at a last time point of the plurality of time points using the first sensor data. The values of the one or more parameters of the object may comprise a stationary status of the object at the last time point. The method may comprise transmitting the values of the one or more parameters of the object to a vehicle approaching the physical location. The method may comprise performing, configured by an autonomous vehicle sensor data processing system of the vehicle, receiving second sensor data captured by a plurality of second sensors mounted on the vehicle. The method may comprise performing, configured by the autonomous vehicle sensor data processing system of the vehicle, determining a driving action of the vehicle using the stationary status of the object at the last time point and the second sensor data.

The method of determining a driving action of a vehicle may comprise, under control of a processor, receiving first sensor data captured at a plurality of time points and by a plurality of first sensors each located at a predetermined physical location and with a predetermined orientation. The method of determining the driving action may comprise determining values of one or more parameters of an object within a first threshold distance of the physical location using the first sensor data at a last time point of the plurality of time points. The values of the one or more parameters of the object may comprise a stationary status of the object at the last time point. The method of determining the driving action may comprise receiving second sensor data captured by a plurality of second sensors mounted on a vehicle. The method of determining the driving action may comprise determining a driving action of the vehicle using the stationary status of the object at the last time point and the second sensor data.

The method of determining a driving action may comprise receiving, under control of a processor, values of one or more parameters of an object within threshold distance of a physical location. The values of the one or more parameters of the object may be determined using first sensor data captured by a plurality of first sensors each located at a predetermined physical location and with a predetermined orientation. The method of determining the driving action may comprise receiving, under control of the processor, second sensor data captured by a plurality of second sensors mounted on the vehicle. The method of determining the driving action may comprise determining, under control of the processor, a driving action of the vehicle using the values of the one or more parameters of the object and the second sensor data.

In some embodiments, the method of determining the values of the one or more parameters of the object may comprise determining the values of the one or more parameters of the object at a first time point and the last time point of the plurality of time points. In some embodiments, the method of determining the values of the one or more parameters of the object may comprise determining the values of at least one of the one or more parameters of the object at the first time point and the last time point may be within a stationary status threshold. In some embodiments, the method of determining the values of the one or more parameters of the object may comprise determining the values of the one or more parameters of the object at a first time point and the last time point of the plurality of time points. In some embodiments, the method of determining the values of the one or more parameters of the object may comprise determining the values of at least one of the one or more parameters of the object at the first time point and the last time point may be below a stationary status threshold.

In some embodiments, the method of determining the values of the one or more parameters of the object may comprise determining the values of the one or more parameters of the object at the last time point using the first sensor data captured at the plurality of time points. In some embodiments, the method of determining the values of the one or more parameters of the object may comprise determining an average value of the values of at least one of the one or more parameters at each of the plurality of time points. The method of determining the values of the one or more parameters of the object may comprise determining the average value may be below a stationary status threshold.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
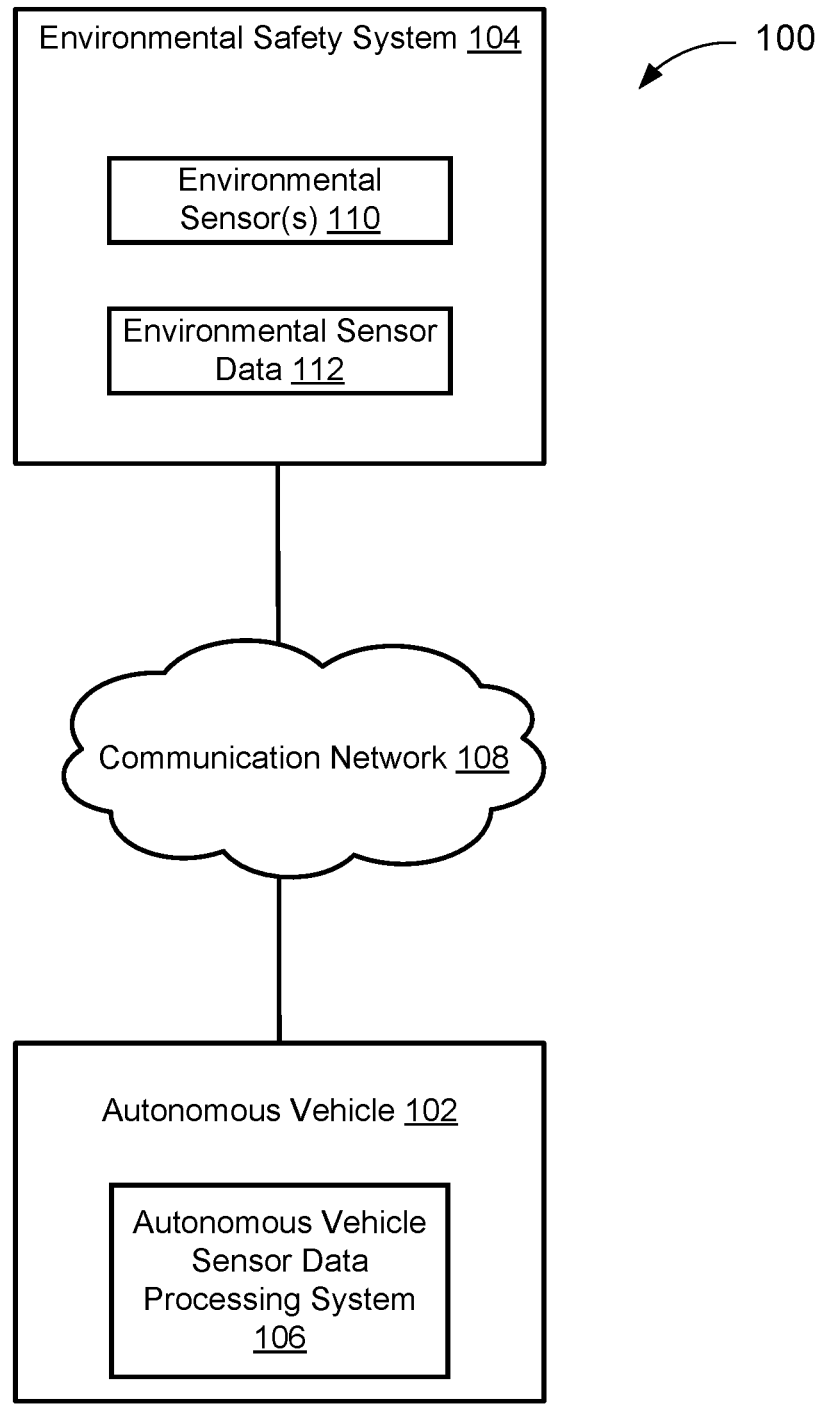
FIG. 1 illustrates a diagram of an example system of a sensor fusion system for sensing vehicles and street in a predetermined physical location, in accordance with some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In general, a vehicle (e.g., an autonomous vehicle, a driverless vehicle, etc.) can have myriad sensors onboard the vehicle. The myriad sensors can include light detection and ranging sensors (or Lidars), radars, cameras, GPS, sonar, ultrasonic, IMU (inertial measurement unit), accelerometers, gyroscopes, magnetometers, FIR (far infrared) sensors, etc. The myriad sensors can play a central role in functioning of an autonomous or driverless vehicle. For example, Lidars can be utilized to detect and identify objects (e.g., other vehicles, road signs, pedestrians, buildings, etc.) in a surrounding. Lidars can also be utilized to determine relative distances of the objects in the surrounding. For another example, radars can be utilized to aid with collision avoidance, adaptive cruise control, blind side detection, assisted parking, etc. For yet another example, cameras can be utilized to recognize, interpret, and/or analyze contents or visual cues of the objects. Cameras and other optical sensors can capture image data using charge coupled devices (CCDs), complementary metal oxide semiconductors (CMOS), or similar elements. An IMU may detect abnormal occurrences such as a bump or pothole in a road. Data collected from these sensors can then be processed and used, as inputs, to make driving decisions (e.g., acceleration, deceleration, direction change, etc.). For example, data from these sensors may be further processed into an image histogram of a graphical representation of tonal distribution in an image captured by the one or more sensors.

Even with such a variety of sensors equipped on a vehicle, it can still be a challenge for a vehicle to recognize objects that can impact driving decisions. In various implements, an environmental safety system may provide information to the passing vehicle that further assists the vehicle's recognition of objects, in particular, stationary objects. The environmental safety system may refer to a sensor system located at a physical location, including streets, parking lots and traffic intersection. The environmental safety system may refer to a sensor system mounted above and/or close to traffic intersections. The sensor system may detect objects, particularly static objects, that may affect the vehicle's driving decisions at the intersection. The environmental safety system may also refer to a sensor system mounted on the streets to detect objects that may affect passing vehicles. The environmental safety system may obtain a set of sensor data comprising stationary status of objects. The sensor of the environmental safety system may detect static objects at or nearby specific physical locations. The sensor of environmental safety system may distinguish static objects from moving objects on the streets. Sensor data generated based on the sensors of the environmental safety system may characterize positions of objects in an environment of the physical location. Specifically, the sensor of the environmental safety system may determine stationary status of objects within a threshold distance of the physical location, and characterize positions of the static objects in the environment of the threshold distance of the physical location. Values of one or more parameters of the static objects for a vehicle may be determined based on the set of sensor data with respect to vehicle approaching the physical location. The environmental safety system may process the data and transmit the values of the one or more parameters of the objects comprising the stationary status to the vehicle. The values of the stationary status of the objects may be fused and/or integrated with sensor data generated from vehicle sensors. An optimized navigation of the vehicle approaching the physical location may be determined based on the stationary status of the objects and sensor data generated based on sensors of the vehicle. An instruction may be provided to the vehicle based on the optimized navigation of the vehicle. Particularly, the environmental safety system may provide a greater degree of intersection safety for vehicle navigation.

The sensors of the environmental safety system and vehicles may include sensors of the same type or sensors of different types. For example, the environmental safety system may include a first sensor and the vehicle may include a second sensor. The first sensor may be of a first sensor type and the second sensor may be of a second sensor type different from the first sensor type. As another example, capabilities of the first sensor and the second sensor may be different.

Different sensor data may characterize positions of different objects. For example, first sensor data generated based on the environmental safety system may characterize a position of an object based on the object being located in the environment of the first sensor. Second sensor data generated based on the second sensor may not characterize the position of the object based on the object not being located in the environment of the second sensor.

Different sensor data may characterize positions of objects differently. For example, the first sensor data may characterize an absolute position of an object in an environment of the first sensor, and the second sensor data may characterize a relative position of the object in an environment of the second sensor with respect to the second sensor and an absolute position of the second sensor. Different sensor data may also characterize movement of the object. For example, the first sensor data may characterize a movement of an object. A current position of the object may be estimated based on the absolute position of the object and the movement of the object. As another example, the second sensor data may characterize a movement of an object with respect to the second sensor. A current position of the object may be estimated based on the relative position of the object with respect to the second sensor, the absolute position of the second sensor, and the movement of the object.

Different sensor data within the set of sensor data may be arranged according to different data formats. For example, the first sensor data may be arranged according to a first data format and the second sensor data may be arranged according to a second data format different from the first data format. Obtaining the first sensor data and the second sensor data may include arranging the first sensor data and the second sensor data according to a standard data format.

Values of one or more parameters of an object for the vehicle may be determined further based on a movement of the vehicle. That is, both the position and the movement of the vehicle may be used to determine the values of the one or more parameters of the object for the vehicle.

One or more changes to a terrain in a location may be determined based on the set of sensor data. For example, a change to a road in a location covered by the set of sensor data may be determined based on the set of sensor data, where the set of sensor data includes sensor data generated at different times. A map for the location may be modified based on the change(s) to the terrain.

The approaches disclosed herein enables provision of vehicle navigation using an environmental safety system. Navigation information of a physical location may be provided to a vehicle based on sensor data generated by one or more sensors external to the vehicle. For example, sensor data generated by sensors from a vehicle in an environment and/or sensor data generated by fixed sensors mounted above and close to traffic intersections may be aggregated to provide vehicle navigation for the vehicle approaching the traffic intersection. That is, the vehicle in the traffic intersection may benefit from the sensor data generated by sensor(s) of other devices (e.g. fixed sensors mounted above and close to the traffic intersection).

While the disclosure is described herein with respect to providing navigation for vehicles using a sensor fusion system, this is merely for illustrative purposes and is not meant to be limiting. The approach disclosed herein may be used to provide navigation for a variety of vehicles. A vehicle may refer to a thing used for transportation. A vehicle may travel on land, on water, under the water, and/or in the air. For example, a vehicle may refer to an automobile, a train, a boat, a ship, a submarine, an airplane, a remote-controlled vehicle, or other vehicle. A vehicle may include an autonomous vehicle. An autonomous vehicle may refer to a vehicle that is capable of navigating without human input. An autonomous vehicle may be fully autonomous or partially autonomous.

The approach disclosed herein may be used to provide navigation for different types of vehicles. The approach disclosed herein may be used to provide navigation for vehicles in different types of locations (e.g., on the road, off the road, on a driving track, in the air, in the water).

FIG. 1 is a schematic diagram illustrating an example of a sensor fusion system 100 for sensing vehicles and street in a predetermined physical location, in accordance with some embodiments. In the example illustrated in FIG. 1, the sensor fusion system 100 includes an environmental safety system 104, an autonomous vehicle 102, an autonomous vehicle sensor data processing system 106, and a communication network 108. In some embodiments, the autonomous vehicle sensor data processing system 106 and the communication network 108 are implemented as part of the autonomous vehicle 102. The autonomous vehicle 102 may be capable of sensing its environment and/or navigating with a limited human input or without human input. The "vehicle" discussed in this disclosure typically includes a vehicle that travels on the ground (e.g. car, truck, bus), but may also include a vehicle that travels in the air (e.g., drones, helicopter, airplanes), travels on water (e.g. boat), and/or the like. The "vehicle" discussed in this disclosure may accommodate one or more users (e.g., passengers, safety drivers) therein.

In one embodiment, the autonomous vehicle 102 includes a vehicle that controls braking and/or acceleration without real time human input. In another embodiment, the autonomous vehicle 102 includes a vehicle that controls steering without real time human input based on inputs from one or more lens mount units. In another embodiment, the autonomous vehicle 102 includes a vehicle that autonomously controls braking, acceleration, and steering without real time human input specifically for parking the vehicle at a specific parking space, such as a parking lot, a curb side of a road (e.g., parallel parking), and a home garage, and so on. Further, "real time human input" is intended to represent a human input that is needed to concurrently control movement of a non-autonomous vehicle, such as gear shifting, steering control, braking pedal control, accel pedal control, crutch pedal control, and so on.

In the example illustrated in FIG. 1, the environmental safety system 104 may include one or more environmental sensors 110. The environmental sensor(s) 110 may detect a set of environmental sensor data 112. The environmental sensor(s) 110 may refer to fixed environmental sensor(s) mounted above and close to a predetermined physical location. The environmental sensor(s) 110 may analyze the set of environmental sensor data 112 to identify objects (e.g. vehicles, pedestrians, obstacles). The environmental sensor data 112 may be generated in response to the environmental sensor(s) 110 detecting and/or measuring physical propert(ies). The environmental sensor data 112 may characterize positions of one or more objects in an environment of a physical location. Objects in an environment of the physical location may refer to living things and/or non-living things in the surroundings of the environmental sensor(s) 110, such as vehicle, a structure (e.g. building, tree, mailbox, light pole, traffic light, road sign), a person (e.g. pedestrians), an animal, and/or other objects in the environment of the environmental sensor(s) 110. In some embodiments, the environmental safety system 104 may also detect "seemingly moving" static object at a physical location. For example, environmental sensor data 112 may characterize static status of the trees that were disturbed by wind at a physical location. In some embodiments, one or more parameters of an object may include an identify of the object, a size of the object, a position of the object, a path of the object, and a speed of the object.

In some embodiments, environmental sensor data's 112 characterization of positions of one or more objects in an environment of a traffic intersection may include environmental sensor data 112 including values and/or other data that are indicative and/or descriptive of the positions of objects in the environment of the environmental sensor(s) 110. For examples, the values of the one or more parameters of an object may include the position of the object, the path of the object and the speed of the object with respect to traffic intersections, with respect to an absolute reference frame, and with respect to a vehicle. As another example, the values of the one or more parameters of an object may include the orientation of the object with respect to traffic intersections. In some embodiments, environmental sensor data's 112 characterization of positions of one or more objects in an environment of a traffic intersection may include environmental sensor data 112 including values and/or other data that are indicative and/or descriptive of the changes in positions of objects in the environment of the environmental sensor(s) 110. For example, the values of the one or more parameters of an object may include changes in positions of the object, changes in the paths of the object, changes in orientations of the object, and changes in the speed of the object with respect to traffic intersection, with respect to an absolute reference frame, and with respect to the vehicle. In some embodiments, environmental sensor data 112 may characterize other aspects of the environment of traffic intersections. For examples, environmental sensor data 112 may characterize operating status of object(s) in the environment and/or how the object(s) are acting at traffic intersections. For example, the environmental sensor data 112 may provide information on how a vehicle nearby traffic intersections is operating, the status of a traffic light (e.g., green, yellow, red, flashing yellow), how a pedestrian is acting, which orientations and/or directions of a vehicle or a pedestrian, and/or other information relating to the object (s).

Figure 2:
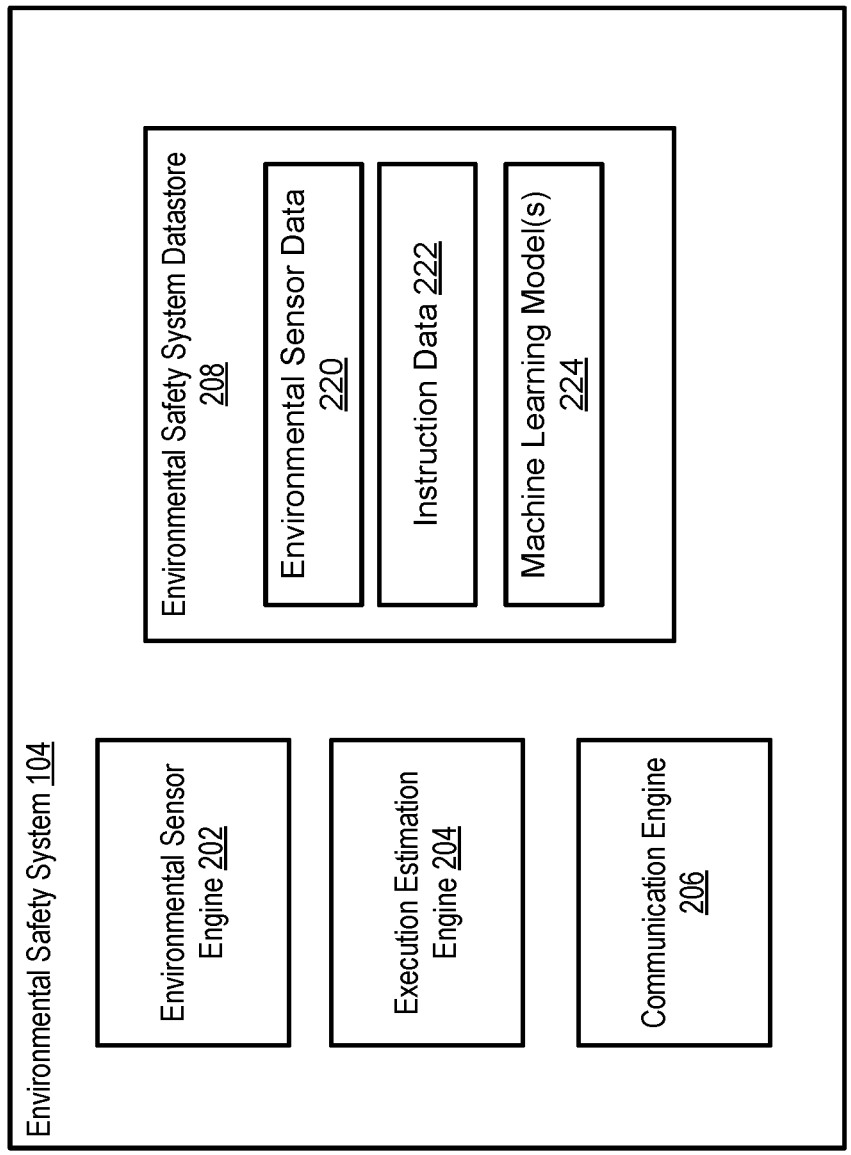
FIG. 2 illustrates a diagram of an example of an environmental safety system, in accordance with some embodiments.

In some embodiments, environmental sensor data 112 may be integrated based on one or more machine learning models. For example, the environmental sensor data 112 may be integrated according to one or more parameters and/or other attributes of a machine learning model configured to determine values of one or more parameters of an object. The environmental safety system 104 may be configured to determine values of one or more parameters of an object. The values of the one or more parameters of the object may refer to an integrated value determined by the machine learning models. For example, the integrated value may be determined by the machine learning model based on one or more environmental sensors 110 and transmitted to the autonomous vehicle 102. An example of the environmental safety system 104 is depicted in FIG. 2.

The autonomous vehicle sensor processing system 106 includes one or more autonomous vehicle sensor(s) and an autonomous vehicle sensor data processer. The autonomous vehicle sensor(s) may be configured to detect objects. The autonomous vehicle sensor(s) may detect objects and analyze the autonomous vehicle sensor data to identify the objects with respect to the vehicle 102. In some embodiments, the autonomous vehicle sensor processing system 106 may include cameras mounted on the autonomous vehicle 102 to capture object images (or sensor data) of regions surrounding the autonomous vehicle 102. For examples, the cameras may capture object images in front of the autonomous vehicle 102, on the sides of autonomous vehicle 102, above the autonomous vehicle 102, below the autonomous vehicle 102, and/or behind the autonomous vehicle 102.

In some embodiments, the autonomous vehicle sensor data processing system 106 may be configured to receive the values of the one or more parameters of objects from the environmental safety system 104. The vehicle sensor data processing system 106 may estimate optimized behaviors based on the autonomous vehicle sensor data and/or the values of the one or more parameters of the objects. In some embodiments, the autonomous vehicle sensor data processing system 106 may utilize machine learning models (e.g. a random forest model) to estimate optimized behaviors of an autonomous vehicle 102. For example, the autonomous vehicle sensor data processing system 106 may integrate the values of the one or more parameters of the objects and the autonomous vehicle sensor data according to a machine learning model, and the machine learning model may output one or more estimated optimized behaviors. This may allow, for example, actions to be taken based on estimated optimized behaviors instead of actual behaviors (e.g. behavior captured only by the autonomous vehicle sensor data processing system). In some embodiments, the values of the one or more parameters of the objects integrated into the autonomous vehicle sensor data processing system 106 may allow, for example, performing fewer computational operations with a period of time than using only autonomous vehicle sensor. In some embodiments, one or more processors in the vehicle safety intersection system 104 may be capable of performing more computational operations within a period of time than the autonomous vehicle sensor data processor 106.

The communications network 108 may represent one or more computer networks (e.g., LAN, WAN, or the like) or other transmission mediums. The communication network 108 may provide communication between the autonomous vehicle 102, systems 104-106, and/or other systems/engine/datastores described herein. In some embodiments, the communication network 108 includes one or more computing devices, routers, cables, buses, and/or other network topologies (e.g., mesh, and the like). In some embodiments, the communication network 108 may be wired and/or wireless. In various embodiments, the communication network 108 may include the Internet, one or more wide area networks (WANs) or local area networks (LANs), one or more networks that may be public, private, IP-based, non-IP based, and so forth.

FIG. 2 illustrates a diagram of an example of an environmental safety system 104 in accordance with some embodiments. In the example of FIG. 2, the environmental safety system 104 includes an environmental sensor engine 202, an execution estimation engine 204, a communication engine 206, and an environmental safety system datastore 208.

Figure 4:
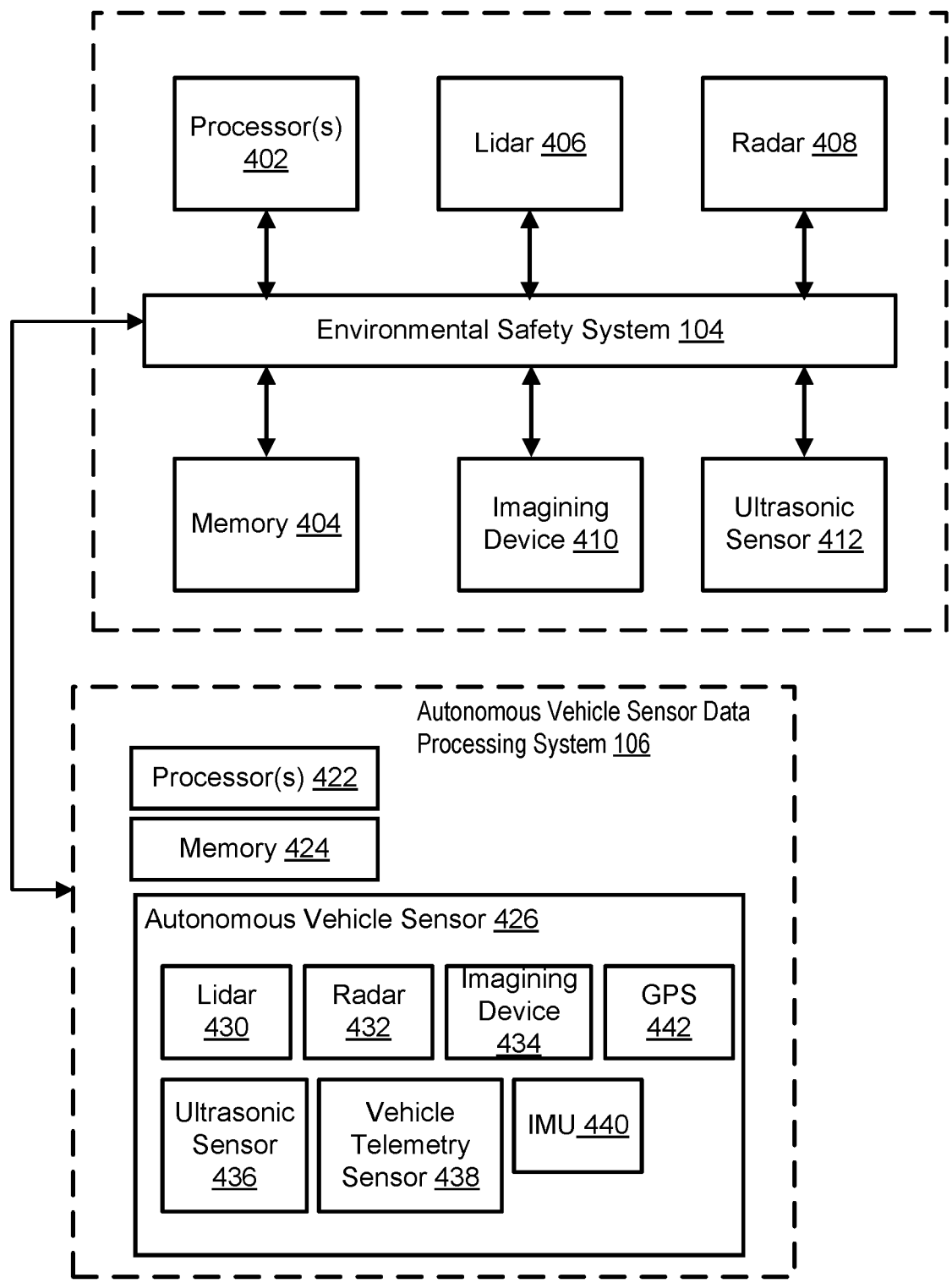
FIG. 4 illustrates an example of sensors of the sensor fusion system, in accordance with some embodiments.

The environmental sensor engine 202 may be configured to obtain and/or detect environmental sensor data 220. In some embodiments, the environmental sensor engine 202 may be configured to obtain one or more sets of environmental sensor data 220. Obtaining environmental sensor data 220 may include accessing, acquiring, analyzing, determining, examining, identifying, loading, locating, opening, receiving, storing, and/or otherwise obtaining the sensor data. The environmental sensor data may be processed in the system 104. An example of environmental sensors in an environmental safety system 104 is depicted in FIG. 4. In some embodiments, the environmental sensor engine 202 may process one or more sets of environmental sensor data 220 and convert and/or integrate the environmental sensor data 220 with instruction data 222. The execution estimation engine 204 may be configured to integrate environmental sensor data 220 with instruction data 222. For example, the execution estimation engine 204 may determine values of one or more parameters of an object based on the environmental sensor data 220. Machine learning model(s) 224 may be configured to determined executable instructions based on the integrated environmental sensor data. In some embodiments, the environmental sensor data 220 may refer to raw data that may be transmitted to the autonomous vehicle sensor data processing system 106 through the communication network.

The communication engine 206 may be configured to communicate with execution estimation engine 204 to transmit values of one or more parameters of objects to a plurality of system. In some embodiments, the communication engine 206 may be configured to encrypt and decrypt communications. The communication engine 206 may be configured to send requests to one or more systems through a communication network or a portion of a communication network. For example, the communication engine 206 may transmit values of one or more parameters of an object to a vehicle approaching a physical location. Depending upon implementation-specific considerations, the communication engine 206 may send requests through a connection, all or a portion of which may be a wireless connection. Communications may be stored at least temporarily (e.g., chased and/or persistently) in the datastore 208.

Figure 3:
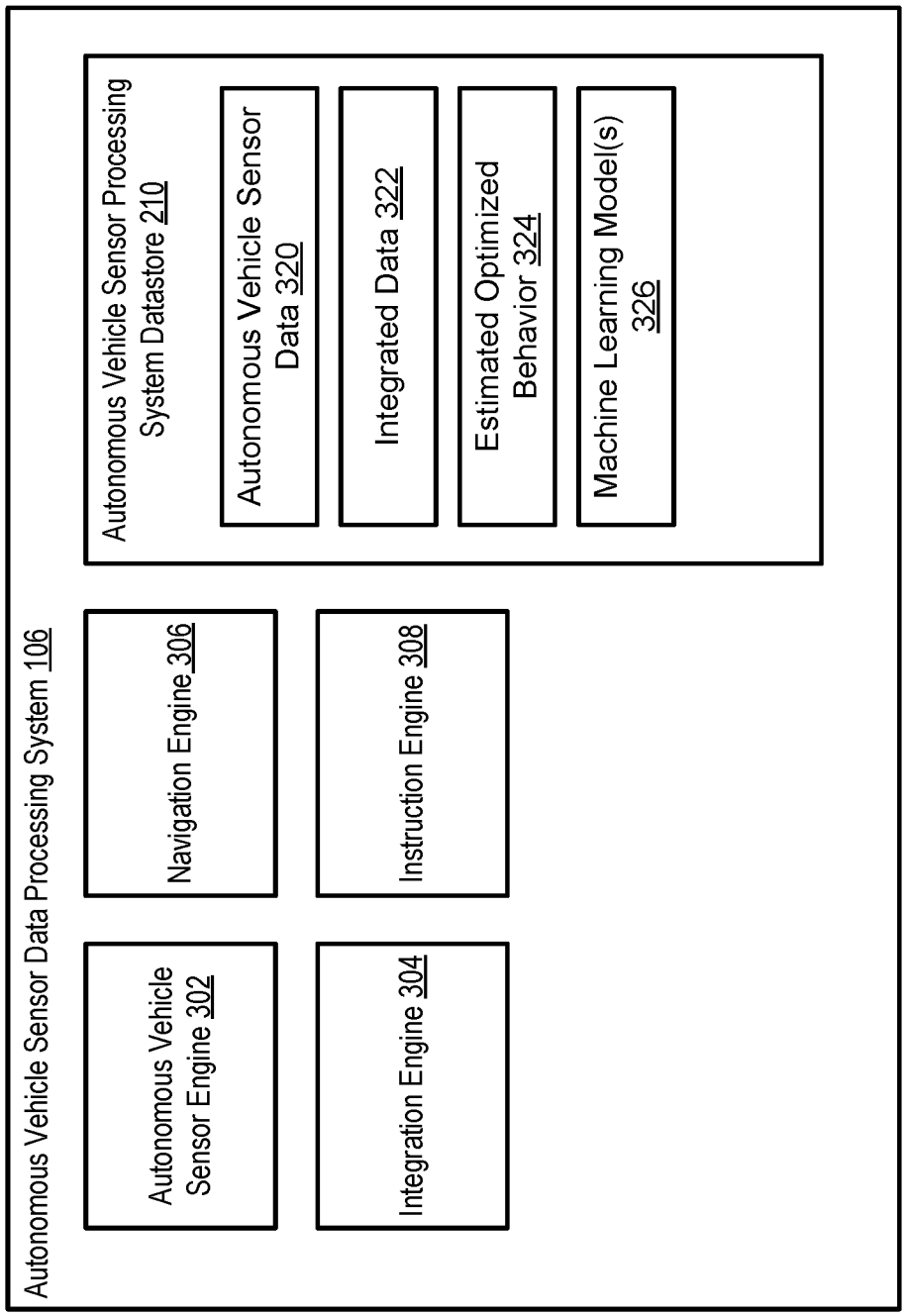
FIG. 3 illustrates a diagram of an example of an autonomous vehicle sensor data processing system, in accordance with some embodiments.

FIG. 3 illustrates a diagram of an autonomous vehicle sensor data processing system 106 in accordance with some embodiments. In the example of FIG. 3, the sensor data processing system 106 includes a sensor engine 302, an integration engine 304, a navigation engine 306, an instruction engine 308, and an autonomous vehicle sensor processing system datastore 210. In some embodiments, a system 106 may control various sensors (e.g., cameras, radar, Lidar) of an autonomous vehicle to detect sensor data 320. The system 106 may be configured to determine an estimated optimized behavior 324 based on the autonomous vehicle sensor data 320 and the values of the one or more parameters of objects transmitted from an environmental safety system.

The autonomous vehicle sensor engine 302 may be configured to obtain one or more sets of sensor data 320. A set of sensor data 320 obtained by the sensor engine 302 may include different sensor data 320 generated based on sensors of the same type and/or different types. A sensor engine 302 may refer to a device that detects and/or measures one or more physical properties. A sensor engine 302 may include a Lidar sensor, a radar sensor, an imaging device, an ultrasonic sensor, a vehicle telemetry sensor, an inertial measurement unit (IMU), and a global positioning system (GPS) sensor. A sensor may record, indicate, and/or otherwise respond to the detected and/or measure physical proper (ties). In some embodiments, the sensor engine 302 may be part of a vehicle, and may be mechanically and electrically. A sensor engine 302 may be positioned within a vehicle and/or positioned outside the vehicle. For example, sensor data 320 may be generated by a sensor carried by a vehicle, such as a Lidar sensor, that determines locations and/movements of objects nearby the vehicle.

The integration engine 304 may be configured to determine integrated data 322 for a vehicle based on the sets of sensor data 320, values of one or more parameters of an object provided by an environmental safety system, and/or other sensor data. The integration engine 304 may integrate the values of the one or more parameters of the objects and the autonomous vehicle sensor data 320 according to machine learning models 326. Integrated data 322 may refer to one or more portions of the set of sensor data that has significance in determining navigation for a vehicle. The integrated data 322 may characterize positions of objects with respect to the vehicle approaching a physical location. In some embodiments, the integrated data 322 may be determined based on identification/extraction of the portions (s) of the set of sensor data 320 that characterizes an environment of a physical location with respect to the vehicle approaching the physical location. For example, the integration engine 304 may determine the integrated data 322 for a vehicle to be the portions(s) of the set of sensor data 320 that characterizes the positions and/or movements of one or more objects with respect to the vehicle approaching a physical location. One or more objects with respect to the vehicle approaching a physical location may refer to other vehicles, persons, animals, traffic light that may affect the navigation or the driving action of the vehicle approaching the physical location.

In some embodiments, the integration engine 304 may gather different sensor data for use based on integrated data 322 and autonomous vehicle sensor data 320. A server or a communication network 108 may gather environmental sensor data 112 generated based on an environmental sensor 110, as shown in FIG. 1, and transmit the values of the one or more parameters of an object to the integration engine 304 of the autonomous vehicle sensor data processing system 106 for the vehicle to determine its own vehicle driving action.

In some embodiments, the navigation engine 306 may be configured to determine one or more optimized driving actions of a vehicle approaching a physical location based on the autonomous vehicle sensor data 320, the integrated data 322, and/or other data. A machine learning model 326 may output one or more estimated optimized behaviors 324, which may allow driving actions to be taken based on estimated optimized behaviors 324 instead of actual behaviors. An optimized driving action of a vehicle may refer to an optimized navigation of the vehicle approaching the physical location. An optimized driving action of a vehicle may include a particular route for the vehicle to take when approaching the physical location. An optimized driving action of a vehicle may include one or more particular movements to be performed by the vehicle and/or the driver of the vehicle approaching the physical location. An optimized driving action of a vehicle may characterize how the vehicle may be moved when approaching the physical location. For example, an optimized driving action of a vehicle may characterize in what directions(s) and what speed(s) the vehicle is optimized to be moved when the vehicle is driving toward the physical location. The optimized driving action of the vehicle may include one or more changes in speed and/or direction in which the vehicle is moving. For instance, the optimized driving action may slow down the speed of the vehicle approaching the physical location based on the sensor data 320 and the integrated data 322.

In some embodiments, integrated data 322 to determine the optimized navigations(s) of a vehicle may allow the navigation engine 306 to determine the optimized driving action based on environmental sensor data provided by multiple environmental sensors. For example, the integrated data 322 used by the navigation engine 306 to determine an optimized driving action of a vehicle may include environmental sensor data generated based on multiple fixed environmental sensors mounted at a specific physical location. In some embodiments, the navigation engine 306 may determine the optimized driving action based on the values of the one or more parameters of objects, the sensor data 320 in the autonomous vehicle sensor processing system 106, and/or the integration of environmental sensor data and the autonomous vehicle sensor data 320.

In some embodiments, the navigation engine 306 of a vehicle may require fewer computational operations when an optimized driving action was determined based on the integrated data 322. The integrated data 322 may be determined based on the vehicle sensor data 320 and values of one or more parameters of an object provided by an environmental safety system. The values of the one or more parameters of the object may shorten the time of processing vehicle sensor data 320 by the integration engine 304. For example, environmental sensor data 220 generated based on a fixed environmental sensor, as shown in FIG. 2, may be integrated into values of one or more parameters of an object with respect to a vehicle approaching to a physical location. The values of the one or more parameters of the object transmitted in the vehicle may shorten the time of processing the vehicle sensor data 320 generated based on the sensors of the vehicle. Thus, the navigation engine 306 may require fewer computational operations in the autonomous vehicle sensor data processing system 106.

In some embodiments, the instruction engine 308 may be configured to provide one or more instructions to the vehicle based on estimated an optimized behavior 324 and/or other sensor data. The instruction(s) may characterize one or more maneuvers (e.g. operations, movements) to be performed by the vehicle to execute the optimized driving action. A maneuver may refer to a particular movement and/or particular operation of a vehicle. The performance of the maneuver(s) by the vehicle may include a driver of the vehicle performing one or more of the maneuvers and/or the vehicle performing the maneuvers on its own based on the instruction(s). An instruction may refer to information that provides details relating to an estimated optimized behavior 324. In some embodiments, an instruction may describe one or more maneuvers to be performed by the driver of the vehicle to execute an optimized driving action. An instruction may also identify an optimized driving action and/or may provide information on how the optimized driving action is to be performed. Such instruction may be provided to the driver visually (e.g. display), verbally (e.g. through a speaker), and/or through other communications medium.

FIG. 4 is a diagram illustrating an example of an fusion sensor system 100 in accordance with some embodiments. The environmental safety system 104 may include one or more processors 402 and a memory 404. The processor(s) 402 may be configured to perform various operations by interpreting machine-readable execution instructions stored in the memory 404. For example, the system 104 may include one or more datastores stored in the memory 404 that are accessible to the system. In some embodiments, the datastore(s) may include various database, application/data packages, and/or other data that are available for download, installation, and/or execution. The environmental safety system 104 may include one or more fixed environmental sensors mounted at a physical location. In some embodiments, the environmental safety system 104 at physical locations may include sensors of the same type and/or different types. The environmental sensors may include Lidar sensors 406, radar sensors 408, imaging devices (e.g. cameras) 410, and ultrasonic sensors 412. Other types of sensors are contemplated. For example, environmental sensor data may be generated by a fixed environmental sensor mounted above and close to the center of a traffic intersection, such as a Lidar sensor 406, that determines locations and/or movements of an object nearby the traffic intersection. In some embodiments, a set of environmental sensor data may be obtained from one or more environmental sensors. A set of environmental sensor data may include one or more environmental sensor data generated by one or more environmental sensors. For instance, a set of environmental sensor data may be generated by multiple environmental sensors mounted above and close to the center of a traffic intersection, such as Lidar sensor 406 and imagining device (e.g. cameras) 410.

In some embodiments, the autonomous vehicle sensor data processing system 106 may also include one or more processors 422 and a memory 424. The processor(s) 422 may be configured to perform various operations by interpreting machine-readable execution instructions stored in the memory 424. For example, the system 106 may include one or more datastores stored in the memory 424 that are accessible to the system 106. In some embodiments, the datastore(s) may include various database, application/data packages, and/or other data that are available for download, installation, and/or execution. The autonomous vehicle sensor data processing system 106 may include one or more sensors in a vehicle. In some embodiments, the autonomous vehicle sensor data processing system 106 may include sensors of the same type and/or different types. The sensors may include Lidar sensors 430, radar sensors 432, imagining devices (e.g. cameras) 434, ultrasonic sensor(s) 436, vehicle telemetry sensor(s) 438, inertial measurement unit(s) (IMU) 440, and global positioning system (GPS) sensors 442. Other types of sensors are contemplated. In some embodiments, the system 106 is configured to manage autonomous vehicle sensor data of an autonomous vehicle. For example, the system 106 may control various sensors (e.g., cameras, radar, Lidar) of the autonomous vehicle to detect sensor data. The system 106 may predict one or more autonomous vehicle driving actions of the autonomous vehicle based on the autonomous vehicle sensor data integrated with the values of the one or more parameters of objects. The system may also process raw data transmitted from the environmental safety system, and integrate the data with the autonomous vehicle sensor data for driving navigation.

Figure 5A:
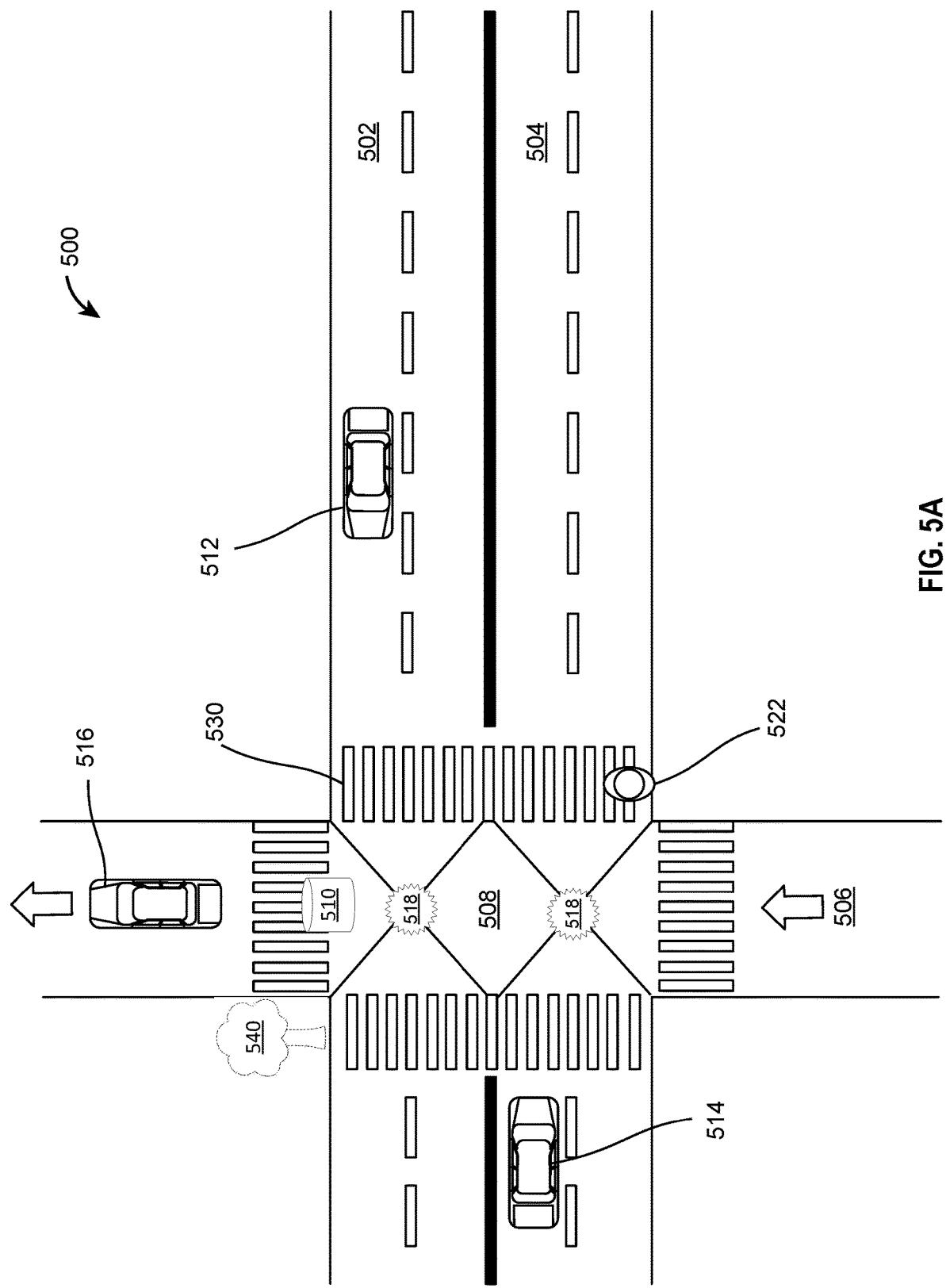
FIG. 5A illustrates an example scenario for providing driving actions to a vehicle based on sensor data provided by the environmental safety system and the vehicle, in accordance with some embodiments.

FIG. 5A illustrates an example scenario 500 for providing vehicle navigation using fixed environmental sensors 518 mounted above and close to traffic intersections 508, in accordance with some embodiments. The scenario 500 may include an environment including roads 502, 504, 506. The roads 502, 504 may individually include two lanes. The traffic on the roads 502, 504 may be traveling opposite of each other. The road 506 may include a one-way road. The roads 502, 504 and the road 506 may intersect at an traffic intersection 508. A vehicle 512 may be on the right lane of the road 502 approaching a traffic intersection 508. A vehicle 514 may be on the left lane of the road 504 ready to turn left to the road 506. A vehicle 516 may be on the lane of the road 506. One or more fixed environmental sensor 518 may be mounted above and close to the traffic intersection 508. The fixed environmental sensors 518 may have different predetermined orientations. In some embodiments, the fixed environmental sensors 518 with different predetermined orientation may be located within a physical housing above and close to the center of the traffic intersection 508. In some embodiments, the fixed environmental sensors 518 may be located at segments of the traffic intersection 608. The fixed environmental sensor 518 located at different segments may have different predetermined orientations at the traffic intersection 508. A pedestrian 520 may be walking on a pedestrian crossing 530. A pedestrian 522 may be walking from the lower-right corner of the traffic intersection 508. The vehicles 512, 514, 516 may be carrying one or more sensors. The sensors of the vehicles 512, 514, 516 and the fixed environmental sensor 518 may be of the same type and/or different types. The capabilities of two or more of the sensors of the vehicle 512, 514, 516 and the fixed environmental sensor 518 may be the same and/or different.

Different environmental sensor data may be generated based on sensors of the fixed environmental sensor 518 or the vehicles 512, 514, 516. Different sensor data may characterize positions of objects within the environment of the different sensors. Different sensor data may be generated based on the sensors of different types, the sensors having different capabilities, the different positioning of the sensors within the environment, and/or other sensor data. Different sensor data generated based on the sensors of the fixed environmental sensor 518 and/or the vehicles 512, 514, 516 may be gathered together.

Integrated data for an optimized navigation of a vehicle 512 may be determined based on the gathered sensor data of the fixed environmental sensor 518 and the position of the vehicle 512. For example, the fixed environmental sensor 518 may detect the objects such as a vehicle 514, a pedestrian 522, and a statute 510 within a threshold distance of the traffic intersection 508. The fixed environmental sensor 518 may determine the value of the one or more parameters of the objects with respect to the fixed environmental sensor 518, with respect to the traffic intersection 508, and the vehicle 512. The movement of the vehicle 512, 514 may also be taken into account when determining the integrated data. The integrated data for the vehicle 512 may characterize positions of objects nearby traffic intersections 508. The optimized navigation of the vehicle 512 may be determined based on the integrated data, and one or more instructions may be provided to the vehicle 512 based on the optimized navigation of the vehicle 512. For example, the fixed environmental sensor 518 may detect the action of a vehicle 514 on the road 504 ready to turn left to the road 506. The vehicle 512 may, based on such data provided by the fixed environmental sensor 518, adjust the speed of the vehicle 512 when approaching the traffic intersection 508.

Figure 5B:
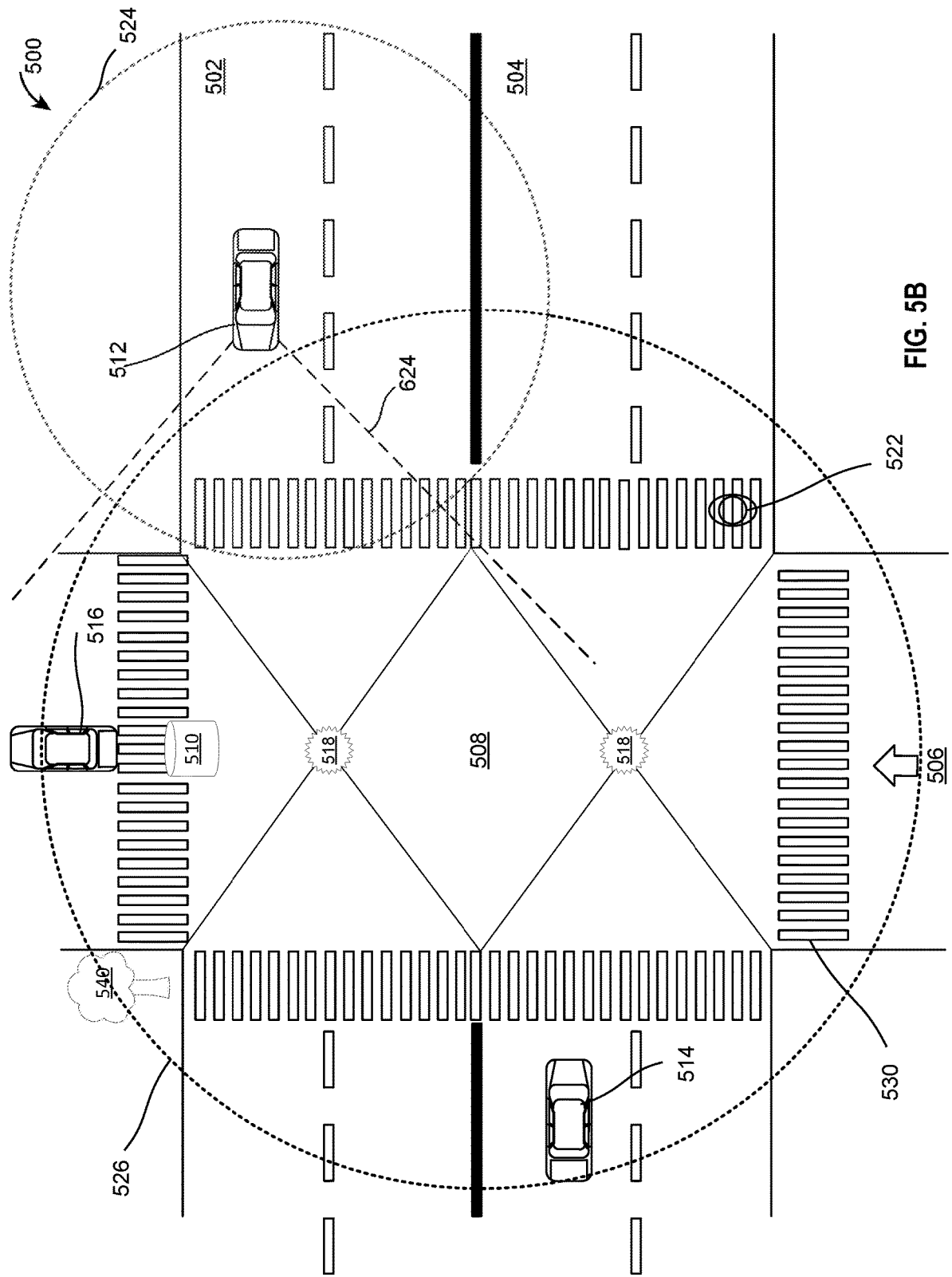
FIG. 5B illustrates an example scenario for providing driving actions to a vehicle based on sensor data provided by the environmental safety system and the vehicle, in accordance with some embodiments.
Figure 5C:
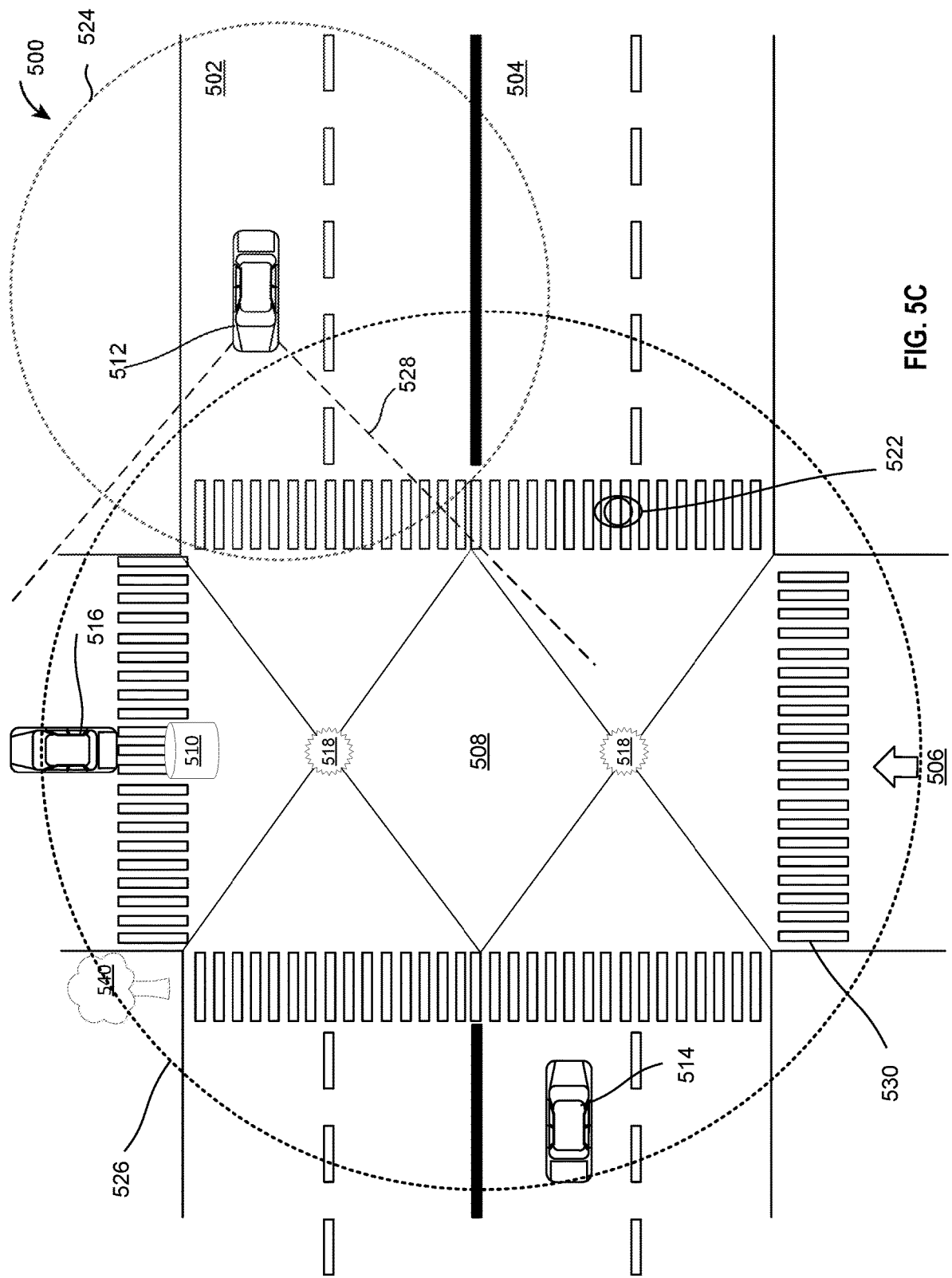
FIG. 5C illustrates an example scenario for providing driving actions to a vehicle based on sensor data provided by the environmental safety system and the vehicle, in accordance with some embodiments.

FIG. 5B and FIG. 5C are example scenarios illustrating vehicle navigation using the fixed environmental sensors 518 nearby a traffic intersection 508 at a plurality of time points. FIG. 5B illustrates an example scenario using the fixed environmental sensor 518 at a first time point of the plurality of time points. FIG. 5C illustrates an example scenario using the fixed environmental sensor 518 at a last time point of the plurality of time points. The fixed environmental sensor 518 may collect historic sensor data of one or more objects (e.g. trees, pedestrians, a vehicle, a statute, a building, an obstacle) within a threshold distance of the traffic intersection 508. The historic sensor data may refer to environmental sensor data captured at a different time points by the fixed environmental sensor 518. For example, as shown in FIG. 5B, the fixed environmental sensor 518 may detect an statute 510 and a pedestrian 522 within a threshold distance of the traffic intersection 508 at a first time point. The fixed environmental sensor 518 may also detect the statute 510 and the pedestrian 522 at the last time point, as shown in FIG. 5C. In some embodiments, the object within a threshold distance of the traffic intersection 508 may be static or moving. For example, the statute 510 on a pedestrian crossing 530 may be static based on the environmental sensor data being the same captured at the first time point and the last time point. As another example, the pedestrian 522 walking on the pedestrian crossing 530 may be a moving object based on the environmental sensor data being different captured at the first time point and the last time point, as shown in FIG. 5B and FIG. 5C respectively.

In some embodiments, the fixed environmental sensor 518 may predict which objects within a threshold distance of the physical location are likely to move in the future, and which are likely to stay static, based on the historic sensor data collected at the physical location. For example, the historic sensor data of the statute 510 may provide a signal to a vehicle 512 with the static status of the statute 510. In some embodiments, the fixed environmental sensor 518 may detect a "seemingly moving" static object and determine the values of one or more parameters of the static object. For example, as shown in FIG. 5C, a fixed tree 540 may be disturbed by wind, and sensors of a vehicle 512 may detect the fixed tree as a moving object as the tree 540 was disturbed by wind. The fixed environmental sensor 518 may detect the fixed tree and collect the data in a plurality of times and, based on the sensor data. The fixed environmental sensor 518 may distinguish between moving objects, static objects, and determine values of one or more parameters of the fixed tree as being static at a traffic intersection 508. The environmental safety system may then transmit the values of the one or more parameters of the "seemingly moving" static tree 540 to the vehicle 512, providing the actual status of the static tree 540 at the traffic intersection 508.

In some embodiments, the fixed environmental sensor 518 may collect and convert the historic sensor data of a static object 510 into integrated data with respect to the traffic intersection 508, with respect to an absolute reference frame, and with respect to the vehicle 512. The fixed environmental sensor 518 may determine values of one or more parameters of the objects at a plurality of time points. The values of the one or more parameters of the object may comprise a stationary status at the last time point. The values of the one or more parameters of the object may also comprise a moving status at the last time point. The stationary status may refer to a status that a position of the object remains the same at different time points. For example, the position of the statute 510 at the traffic intersection 530 does not change at the first time point, as shown in FIG. 5B, and at the last time point, as shown in FIG. 5C. The fixed environmental sensor 518 may determine that the values of the one or more parameters of the statute 510 may comprise a stationary status. As another example, the position of the pedestrian 522 on the pedestrian crossing 530 changes at the first time point, as shown in FIG. 5B, and at the last time point, as shown in FIG. 5C, with respect to the traffic intersection 508 and the vehicle 512 such that the value of the one or more parameters of the pedestrian 522 may not comprise a stationary status determined by the fixed environmental sensor 518.

In some embodiments, a stationary status threshold may be determined by the values of the one or more parameters of the object at the first time point and the last time point. The stationary status threshold may be 1 mm of moving distance captured by the fixed environmental sensor 518. The fixed environmental sensor 518 may determine the values of at least one or more parameters of the object at the first time point and the last time point being below and/or within the stationary status threshold (e.g. the moving distance of the object at the first time point and the last time point is within and/or below 1 mm captured by the fixed environmental sensor). In some embodiments, a stationary status threshold may also be determined by an average value of the values of at least one or more parameters of an object at each plurality of time points. The value of the values of the at least one or more parameters of the object comprising a stationary status (e.g. the stationary status threshold is within and/or below 1 mm) may be collected and converted by the fixed environmental sensor, and transmitted to vehicles 512 approaching a traffic intersection 508. In some embodiments, the fixed environmental sensors 518 may determine an average value of the values of the at least one of the one or more parameters of the object at each of the plurality of time points comprising a stationary status. The average value of the values of the at least one of the one or more parameters of the object at each of the plurality of time points within and/or below the stationary status threshold may be transmitted to vehicles 512 approaching the traffic intersection 508.

In some embodiments, the fixed environmental sensor 518 mounted above and close to a traffic intersection 508 may improve and enhance the detection of vehicle sensors. A fixed environmental sensor 518 may capture different perspectives of a static object 510 and determine the position of the object and the object's stationary status. A vehicle sensor may only capture certain perspectives of an object, and may not be able to determine the stationary status of the object. For example, as shown in FIG. 6B and FIG. 5C, the fixed environmental sensor 518 may capture a statute 510 on a pedestrian crossing 530 at a traffic intersection 508. The fixed environmental sensor 518 may further detect the position of the statute 510 at a plurality of time points, and the stationary status of the statute 510 based on one or more parameters of the statute 510 with respect to the fixed environmental sensor 518, with respect to the traffic intersection 508, or with respect to the approaching vehicle 512. The fixed environmental sensor 518 may also determine the value of the one or more parameters of the statute 510 based on the statute's 510 position. For example, the environmental fixed sensor 518 may determine the statute 510 is within and/or below a stationary status threshold (e.g. moving distance between the first and last time point is zero or below 1 mm) and transmit the environmental sensor data to the vehicle 512 approaching the traffic intersection 508. The vehicle sensor (e.g. camera 528) may capture the imagine of the statute 510 at the traffic intersection 508, but may not be able to determine the stationary status and the position of the statute 510 being static with respect to the traffic intersection 508 or with respect to the vehicle 512. The fixed environmental sensor 518 may transmit the statute's 510 stationary status to the vehicle 512 approaching the traffic intersection 508. The values of the at least one or more parameters of the object at the last time point may fuse with the vehicle sensor data to determine a driving action based on the stationary status of the statute 510.

FIG. 5B illustrates vehicle navigation using the vehicle sensors and fixed environmental sensor 518 at traffic intersections 508. The capabilities of the sensors of the vehicles and the environmental sensors 518 mounted above and close to the center of traffic intersections 508 may be the same and/or different. In some embodiments, sensing technology of the Lidars of the fixed environmental sensor 518 mounted above and close to the traffic intersection and/or the vehicle 512 may be the same or different. For example, the Lidar of the fixed environmental sensor 518 may have a larger range of detection (covering an area 526) than the Lidar of the vehicle (covering an area 524). As another example, the Lidar of the fixed environmental sensor and the Lidar of the vehicle may have the same scan rate. In some embodiments, the imaging technology of the cameras of the fixed environmental sensor 518 and/or the vehicle 512 may be the same or different. For example, a field of view 528 of the camera of the vehicle 512 may be wider than a field of view 526 of the camera of the fixed environmental sensor 518. As another example, the resolution of the cameras of the fixed environmental sensor 518 and the vehicle 512 may be different and/or the same. Other capabilities of sensors are contemplated.

In some embodiments, different sensor data may be generated based on sensors of the fixed environmental sensor 518 or the vehicles 512, 514, 516. Different sensor data may characterize positions of objects within the environment of the different sensors. For example, sensor data generated based on the camera of the fixed environmental sensor 518 may characterize the movement of the pedestrian 522 based on the person being within the field of view 526 of the camera. Sensor data generated based on the camera of the vehicle 512 may not characterize the movement of the pedestrian 522 based on the pedestrian 522 being outside the field of view 528 of the camera. As another example, sensor data generated based on the camera of the fixed environmental sensor 518 may characterize the position and all perspectives of the statute 510 with respect to the vehicle 512 based on the statute is within the cover area 526 of the camera mounted above and close to the traffic intersection 508. Sensor data generated based on the camera of the vehicle 512 may not characterize the position of the statute 510 with respect to the vehicle 512 based on the camera of the vehicle 512 capturing images from only one direction 528.

In some embodiments, sensor data generated based on the Lidar 526 of the fixed environmental sensor 518 may detect the whole area nearby or of a traffic intersection 508, while the sensor data generated based on the Lidar 524 of the vehicle 512 may not include sensor data nearby or of the traffic intersection 508. For example, the Lidar of the vehicle 512 may not detect the vehicle 514 on the road 504 ready to turn left to the road 506. Therefore, different sensor data may provide data on positions of objects and/or lack of objects in different parts of the environments shown in the scenario 500.

The driving action determined may be different based on different sensor data provided by one or more fixed environmental sensors 518 and/or vehicles 512. In some embodiments, the driving action of a vehicle 512 using integrated data from a fixed environmental sensor 518 and sensor data from the vehicle 512 is different from the driving action of the vehicle 512 using sensor data solely from the vehicle 512. For example, sensor data generated based on a camera of the fixed environmental sensor 518 mounted above and close to a traffic intersection 508 cover the whole area of the traffic intersection 526. The sensor data generated based on the sensors of the fixed environmental sensor 518 may characterize the position of a statute 510 and the movement of a pedestrian 522 walking on a pedestrian crossing 630 of the traffic intersection 508 (e.g. detecting the statute 510 and pedestrians 522 that may block or slow down the vehicle 512 approaching the traffic intersection 508), while the sensor data generated based on the sensors of the vehicle 512 may not characterize the movement of the pedestrian 522 being outside of the field of view 528 of the camera or the cover area 524 of Lidar on the vehicle (e.g. the driving action of the vehicle 512 may not be affected by the pedestrian 522 when the vehicle 512 approaches the traffic intersection 508). Therefore, the driving action of the vehicle 512 determined by the sensor data generated based on the sensors of both the fixed environmental sensor 518 and the vehicle 512 may be different from the driving action determined by the sensor data generated based on the sensors of the vehicle 512 alone.

Figure 6:
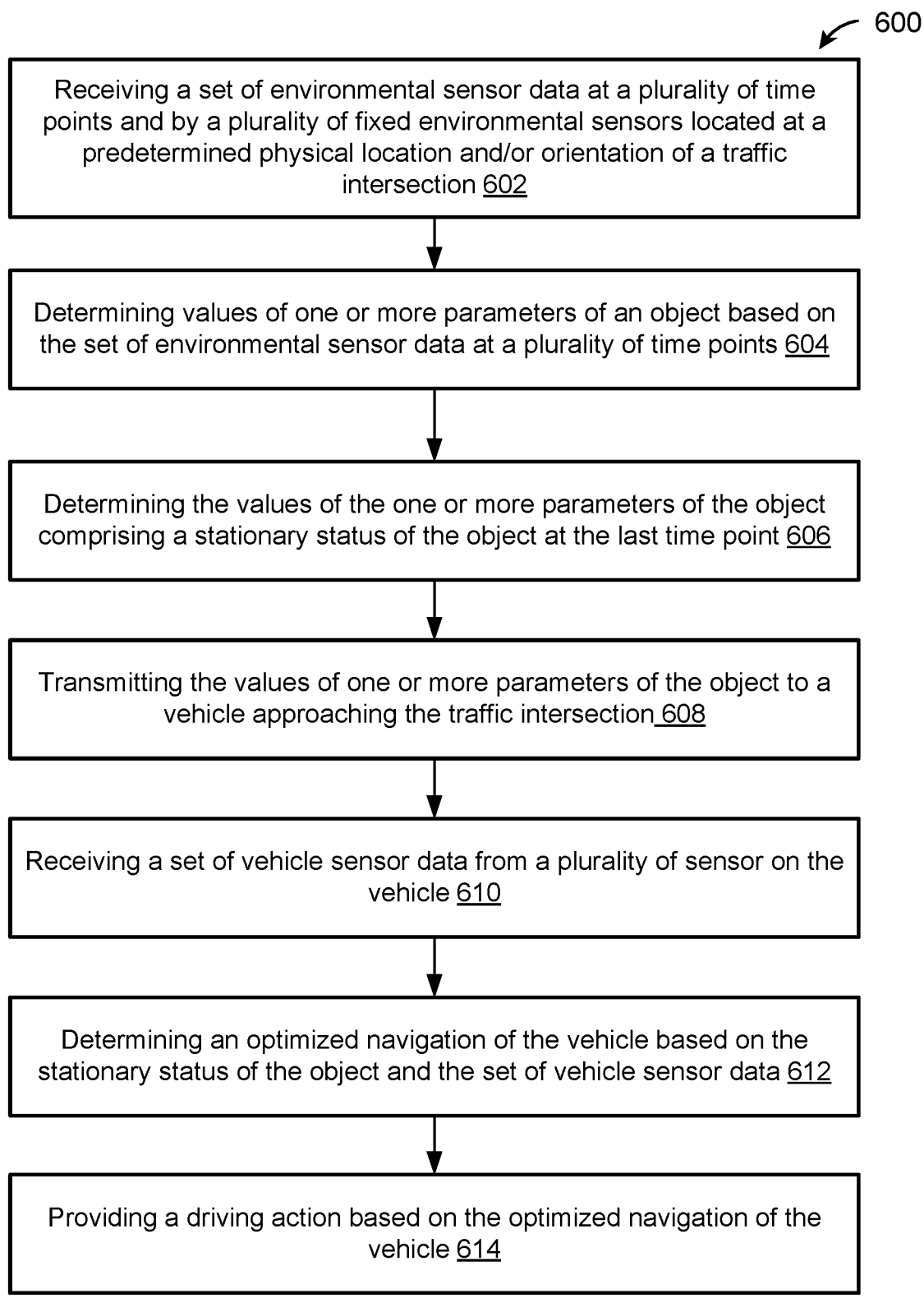
FIG. 6 illustrates a flowchart of an example method, in accordance with some embodiments.

FIG. 6 illustrates a flowchart of an example method 600 for safety navigation of a vehicle based on sensor data provided by fixed environmental sensors at physical locations and a vehicle, in accordance with some embodiments. In this and other flowcharts, the flowchart illustrates by way of examples a sequence of steps. It should be understood the example method may include additional, fewer, or alternative steps performed in various orders or in parallel. The example method 600 may be implemented in various computing systems or devices including one or more processors. In step 602, an environmental safety system may obtain a set of environmental sensor data at a plurality of time points. The set of environmental sensor data may be detected by a plurality of fixed environmental sensors mounted at a physical location. The plurality of fixed environmental sensors may be located at a predetermined physical location and/or orientation of the physical location. In step 604, the environmental safety system may determine values of one or more parameters of an object within a threshold distance of the physical location at a last time point based on the set of environmental sensor data. In step 606, the environmental sensor may determine the values of the one or more parameters of the object at the last time point comprising a stationary status. In step 608, the values of the one or more parameters of the object may be transmitted to a vehicle approaching the physical location. In some embodiments, the values of the one or more parameters of the object may characterize positions of the object at the last time point with respect to the vehicle, with respect to the physical location, and with respect to an absolute reference frame. In step 610, a set of vehicle sensor data generated based on a plurality of sensors of the vehicle may be obtained in the vehicle. In step 612, an optimized navigation may be determined based on the set of vehicle sensor data and the values of the one or more parameters of the object at the last time point transmitted to the vehicle. In step 614, a driving action may be provided to the vehicle based on the optimized navigation of the vehicle.

Figure 7:
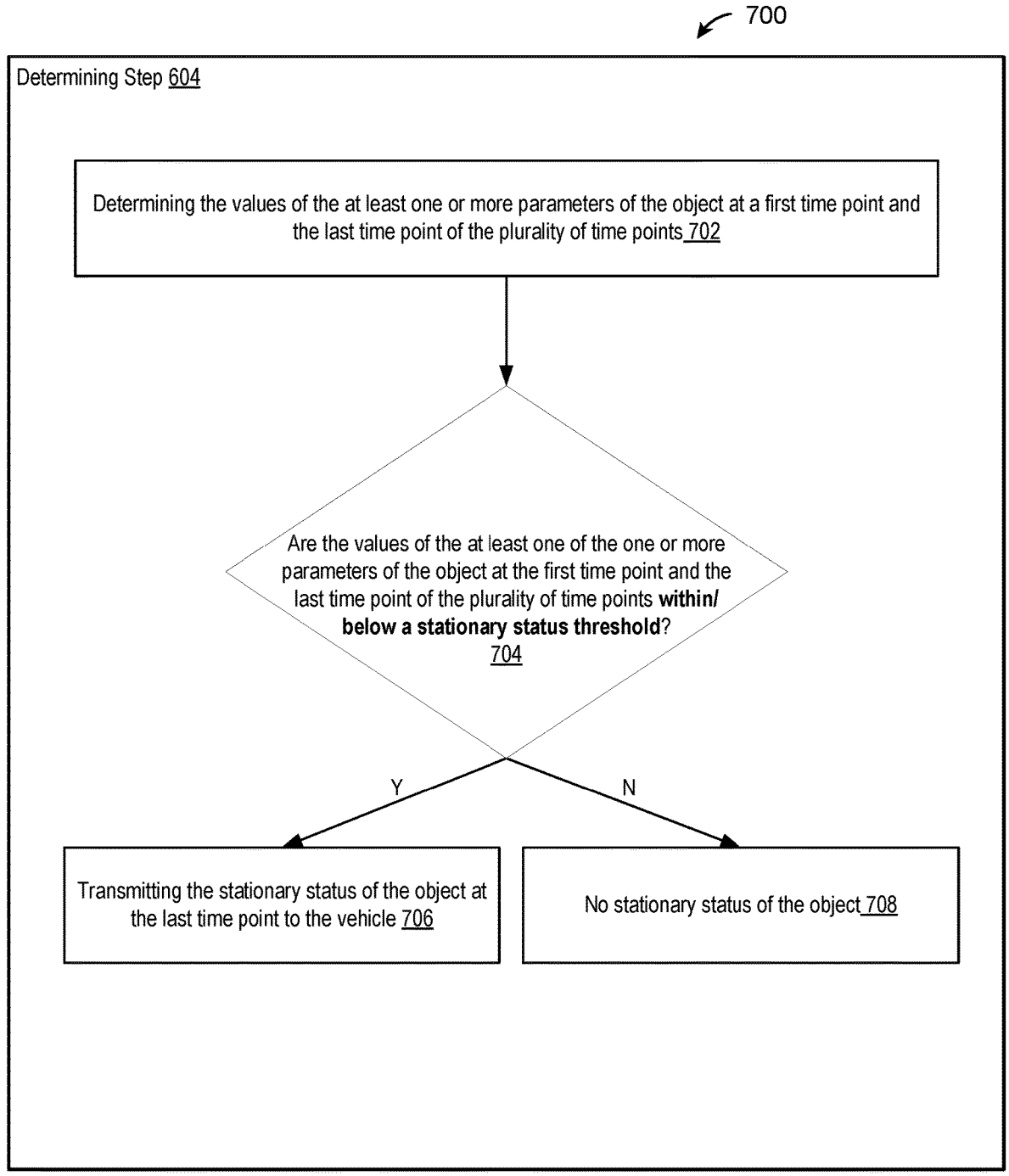
FIG. 7 illustrates a flowchart a determining step of the example method, in accordance with some embodiments.

FIG. 7 illustrates a flowchart 700 of an example of step 604, a determination step, in accordance with some embodiments. In step 702, the environmental safety system 104 may determine the values of the one or more parameters of the object at a first time point and the last time point of the plurality of time points. The environmental safety system 104 may determine whether the values of the at least one of the one or more parameters of the object at the first time point and the last time point are within and/or below a stationary status threshold. The stationary status threshold may refer to a moving distance of the object is zero or 1 mm. For example, the value of the one or more parameters of a static object may comprise a stationary status such that the system 104 may transmit the stationary status of the object at the last time point to the vehicle in step 706.

Figure 8:
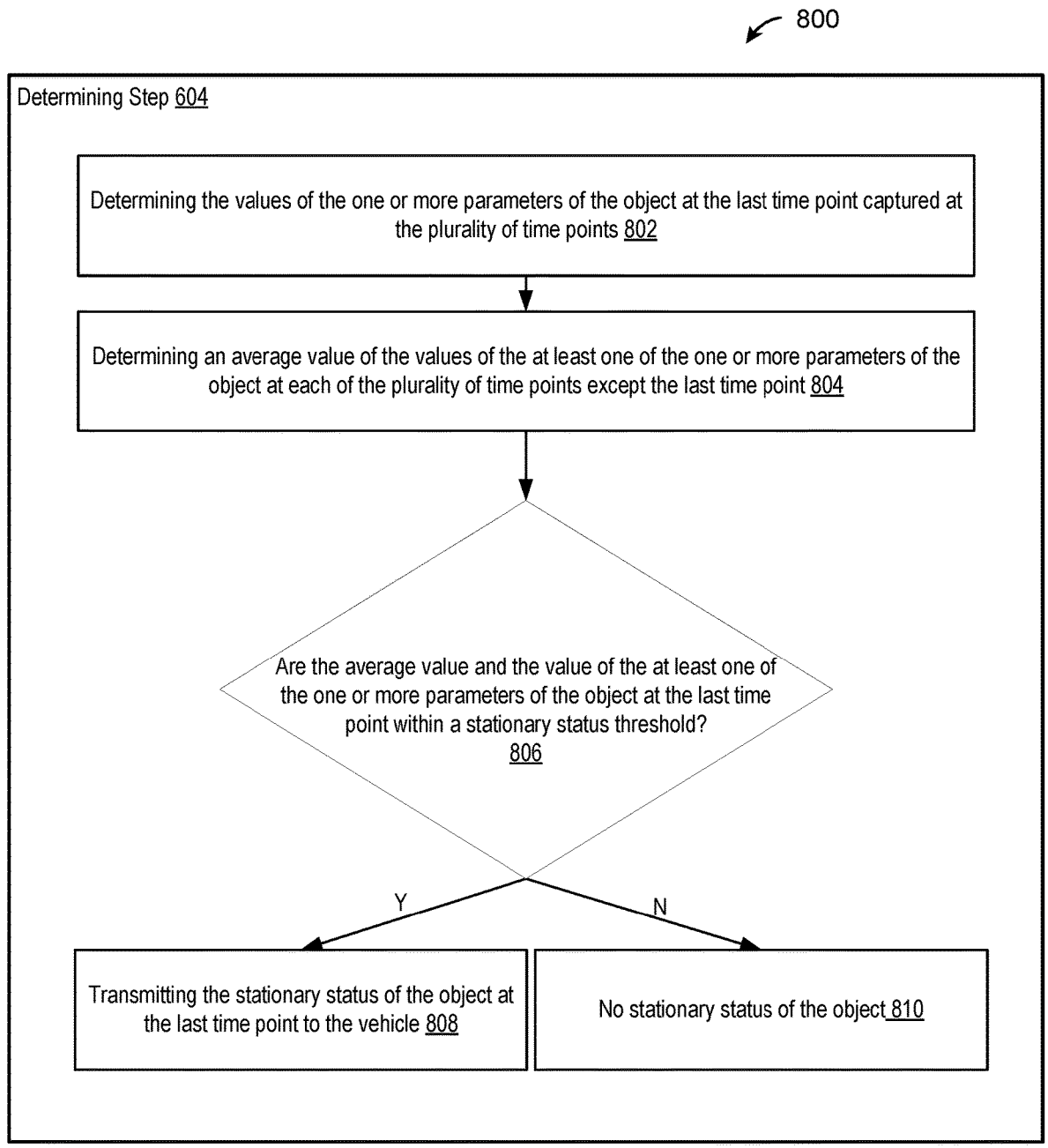
FIG. 8 illustrates a flowchart a determining step of the example method, in accordance with some embodiments.

FIG. 8 illustrates a flowchart 800 of an example of step 604, a determination step, in accordance with some embodiments. In step 802, the environmental safety system 104 may determine the values of the one or more parameters of the object at the last time point. In step 804, the system 104 may determine an average value of the values of the at least one of the one or more parameters of the object at each of the plurality of time points except the last time point. In step 806, the system 104 may determine whether the average value and the value of the at least one or more parameters of the object at the last time point are within a stationary status threshold. For example, if the average value and the value of the at least one or more parameters of the object at the last time point are within a stationary status threshold, the stationary status of the object may be transmitted to the vehicle sensor to improve the vehicle sensing detection 808.

Figure 9:
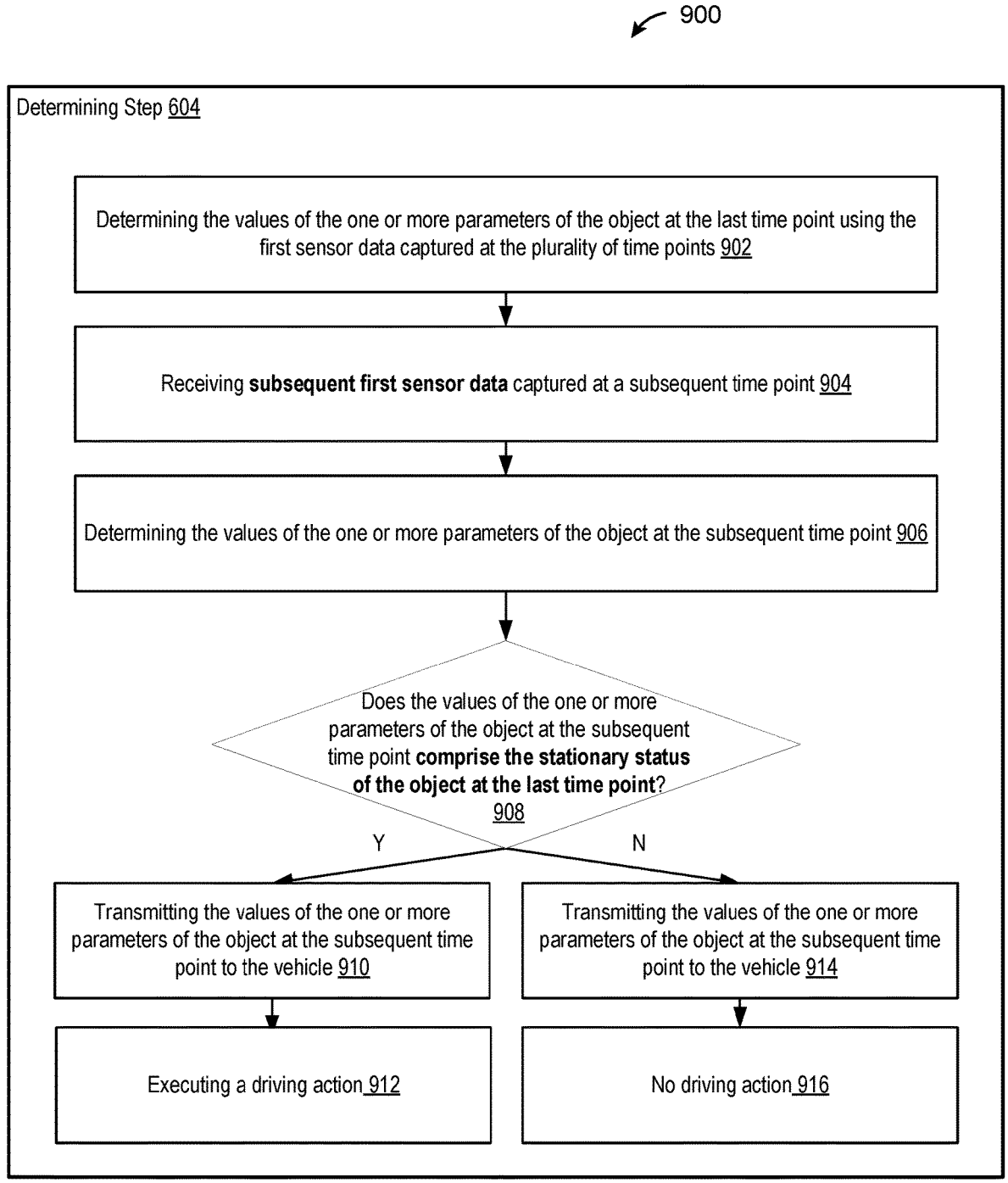
FIG. 9 illustrates a flowchart a determining step of the example method, in accordance with some embodiments

FIG. 9 illustrates a flowchart 900 of an example of step 604, a determination step, in accordance with some embodiments. In step 902, the environmental safety system 104 may determine the values of the one or more parameters of the object at the last time point. In step 904, the system 104 may receive subsequent first sensor data captured at a subsequent time point. In step 906, the system 104 may determine the values of the one or more parameters of the object at the subsequent time point. In step 908, the system 104 may determine whether the values of the one or more parameters of the object at the subsequent time point comprise a stationary status of the object at the last time point. In step 910 and 912, if the values of the one or more parameters of the object at the subsequent time point comprise the stationary status, the stationary status of the object may be transmitted to the vehicle and the vehicle may execute a optimized driving action.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 10:
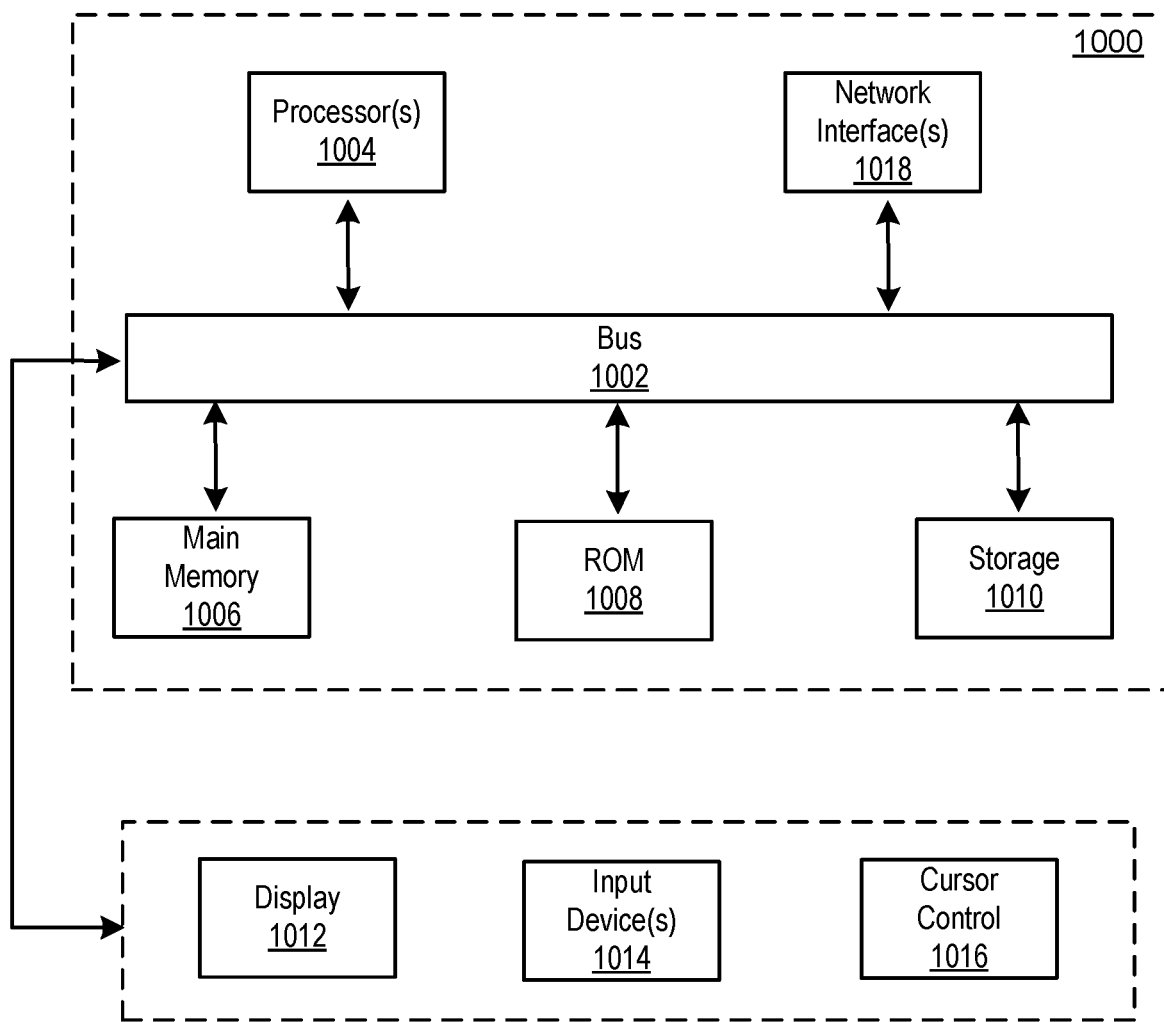
FIG. 10 is a diagram of an example computer system for implementing the features disclosed herein.

FIG. 10 is a block diagram that illustrates a computer system 1000 upon which any of the embodiments described herein may be implemented. The computer system 1000 includes a bus 1002 or other communication mechanism for communicating information, one or more hardware processors 1004 coupled with bus 1002 for processing information. Hardware processor(s) 1004 may be, for example, one or more general purpose microprocessors.

The computer system 1000 also includes a main memory 1006, such as a random access memory (RAM), cache and/or other dynamic storage devices, coupled to bus 1002 for storing information and instructions to be executed by processor 1004. Main memory 1006 also may be used for storing temporary variables or other intermediate information during execution of instructions to be executed by processor 1004. Such instructions, when stored in storage media accessible to processor 1004, render computer system 1000 into a special-purpose machine that is customized to perform the operations specified in the instructions.

The computer system 1000 further includes a read only memory (ROM) 1008 or other static storage device coupled to bus 1002 for storing static information and instructions for processor 1004. A storage device 1010, such as a magnetic disk, optical disk, or USB thumb drive (Flash drive), etc., is provided and coupled to bus 902 for storing information and instructions.

The computer system 1000 may be coupled via bus 1002 to output device(s) 1012, such as a cathode ray tube (CRT) or LCD display (or touch screen), for displaying information to a computer user. Input device(s) 1014, including alphanumeric and other keys, are coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 1000 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor(s) 1004 executing one or more sequences of one or more instructions contained in main memory 1006. Such instructions may be read into main memory 1006 from another storage medium, such as storage device 1010. Execution of the sequences of instructions contained in main memory 1006 causes processor(s) 1004 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may retrieves and executes the instructions. The instructions received by main memory 1006 may optionally be stored on storage device 1010 either before or after execution by processor 1004.

The computer system 1000 also includes a communication interface 1018 coupled to bus 1002. Communication interface 1018 provides a two-way data communication coupling to one or more network links that are connected to one or more local networks. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN (or WAN component to communicated with a WAN). Wireless links may also be implemented. In any such implementation, communication interface 1018 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 1018, which carry the digital data to and from computer system 1000, are example forms of transmission media.

The computer system 1000 can send messages and receive data, including program code, through the network (s), network link and communication interface 1018. In the Internet example, a server might transmit a requested code for an application program through the Internet, the ISP, the local network and the communication interface 1018.

The received code may be executed by processor 1004 as it is received, and/or stored in storage device 1010, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An environmental safety system comprising:
   first sensors each located at a predetermined physical location and with a predetermined orientation;
   a first non-transitory memory storing executable instructions;
   one or more first processors in communication with the first sensors and the first non-transitory memory, the one or more first processors programmed by the executable instructions stored in the first non-transitory memory to perform:
   receiving first sensor data captured at time points and by the first sensors;
   determining values of a parameter of an object within a first threshold distance of the physical location at a last time point of the time points using the first sensor data, the values of the parameter of the object comprising a stationary status of the object at the last time point, wherein determining the values of the parameter of the object comprises:

determining the values of the parameter of the object at the last time point using the first sensor data captured at the time points, determining an average value of the values of the parameter of the object at each of the time points except the last time point, and determining the average value and the value of the parameter of the object at the last time point are within a stationary status threshold;

transmitting the values of the parameter of the object to a vehicle approaching the physical location;

a second non-transitory memory storing executable instructions;

one or more second processors in communication with the second non-transitory memory, the one or more second processors programmed by the executable instructions stored in the second non-transitory memory to perform:

receiving second sensor data captured by second sensors mounted on the vehicle; and determining a driving action of the vehicle using the stationary status of the object at the last time point and the second sensor data.

2. The system of claim 1, wherein determining the driving action of the vehicle further comprises determining the driving action of the vehicle using the values of the parameter of the object.

3. The system of claim 1, wherein determining the values of the parameter of the object comprises:

determining the values of the parameter of the object at a first time point and the last time point of the time points; and determining the values of the parameter of the object at the first time point and the last time point are within a stationary status threshold.

4. The system of claim 1, wherein determining the values of the parameter of the object comprises:

determining the values of the parameter of the object at the first time point and the last time point of the time points; and determining the values of the parameter of the object at the first time point and the last time point are below a stationary status threshold.

5. The system of claim 1, wherein determining the values of the parameter of the object comprises:

determining an average value of the values of the parameter at each of the time points; and determining the average value is below a stationary status threshold.

6. The system of claim 1, further comprising:

receiving subsequent first sensor data captured at a subsequent time point;

determining the values of the parameter of the object at the subsequent time point using the first sensor data, the values of the parameter of the object not comprising the stationary status of the object at the last time point; and transmitting the values of the parameter of the object at the subsequent time point to the vehicle.

7. The system of claim 1, further comprising:

receiving subsequent first sensor data captured at a subsequent time point;

determining the values of the parameter of the object at the subsequent time point using the first sensor data, the values of the parameter of the object comprising the stationary status of the object at the last time point; and transmitting the values of the parameter of the object at the subsequent time point to the vehicle.

8. The system of claim 1, wherein the vehicle is an autonomous vehicle or a semi-autonomous vehicle, and/or wherein the object is a second vehicle, a pedestrian, a statute, a building, or an obstacle, any of which are located within the first threshold distance of the physical location.

9. The system of claim 1, wherein the first sensors comprise sensors of different types, wherein the first sensors comprises a Light Detection and Ranging (Lidar), a Radio Detection and Ranging (Radar), an imaging device, an ultrasonic sensor, and/or wherein the second sensors comprises a Lidar, a Radar, an imaging device, an ultrasonic sensor, a vehicle telemetry sensor, an inertial measurement unit (IMU), and a global positioning system (GPS) sensor.

10. The system of claim 1, wherein the parameter of the object comprise an identity of the object, a size of the object, a position of the object, a path of the object, and/or a speed of the object.

11. The system of claim 10, wherein the values of the parameter of the object comprise the position of the object with respect to the physical location, with respect to an absolute reference frame, or with respect to the vehicle.

12. A method for road safety comprising:

under control of one or more first processors:

receiving first sensor data captured at time points and by first sensors, wherein each of the first sensors is located at a predetermined physical location and with a predetermined orientation;

determining values of a parameter of an object within a first threshold distance of the physical location at a last time point of the time points using the first sensor data, the values of the parameter of the object comprising a stationary status of the object at the last time point, wherein determining the values of the parameter of the object comprises:

determining the values of the parameter of the object at the last time point using the first sensor data captured at the time points, determining an average value of the values of the parameter of the object at each of the time points except the last time point, and determining the average value and the value of the parameter of the object at the last time point are within a stationary status threshold; and transmitting the values of the parameter of the object to a vehicle approaching the physical location;

under control of one or more second processors:

receiving second sensor data captured by second sensors mounted on the vehicle; and determining a driving action of the vehicle using the stationary status of the object at the last time point and the second sensor data.

13. A method of determining a driving action of a vehicle comprising:

under control of a processor:

receiving first sensor data captured at time points and by first sensors each located at a predetermined physical location and with a predetermined orientation;

determining values of a parameter of an object within a first threshold distance of the physical location using the first sensor data at a last time point of the time points, wherein the values of the parameter of the object comprise a stationary status of the object at the last time point, and determining the values of the parameter of the object comprises:

determining the values of the parameter of the object at the last time point using the first sensor data captured at the time points, determining an average value of the values of the parameter of the object at each of the time points except the last time point, and determining the average value and the value of the parameter of the object at the last time point are within a stationary status threshold;

receiving second sensor data captured by second sensors mounted on a vehicle; and determining a driving action of the vehicle using the stationary status of the object at the last time point and the second sensor data.

14. The method of claim 13, wherein determining the values of the parameter of the object comprises:

determining the values of the parameter of the object at a first time point and the last time point of the time points; and determining the values of the parameter of the object at the first time point and the last time point are within a stationary status threshold.

15. The method of claim 13, wherein determining the values of the one or more parameters of the object comprises:

determining the values of the parameter of the object at the first time point and the last time point of the time points; and determining values of the parameter of the object at the first time point and the last time point are below a stationary status threshold.

16. The method of claim 13, wherein determining the values of the one or more parameters of the object comprises:

determining an average value of the values of the parameter at each of the time points; and determining the average value is below a stationary status threshold.

* * * * *